United States Patent
Urano et al.

(10) Patent No.: US 6,333,283 B1
(45) Date of Patent: Dec. 25, 2001

(54) SILICA GLASS ARTICLE AND MANUFACTURING PROCESS THEREFOR

(75) Inventors: Akira Urano, Yokohama (JP); Toshio Danzuka, Cary, NC (US); Tatsuhiko Saito, Yokohama (JP); Yasuhiko Shishido, Yokohama (JP); Masaharu Mogi, Yokohama (JP); Michihisa Kyoto, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/369,425

(22) Filed: Aug. 6, 1999

Related U.S. Application Data

(63) Continuation-in-part of application No. 09/080,247, filed on May 18, 1998, now Pat. No. 5,983,673.

(30) Foreign Application Priority Data

| May 16, 1997 | (JP) | 9-127285 |
| Mar. 31, 1998 | (JP) | 10-86709 |
| Jan. 12, 1999 | (JP) | 11-05581 |

(51) Int. Cl.$^7$ .............. C03C 3/06; C03C 13/04
(52) U.S. Cl. .............. 501/54; 501/37; 501/905
(58) Field of Search .............. 501/37, 905, 54

(56) References Cited

U.S. PATENT DOCUMENTS

| 5,325,230 | 6/1994 | Yamagata et al. | 359/350 |
| 5,326,729 | * 7/1994 | Yaba et al. | 501/54 |
| 5,364,433 | * 11/1994 | Nishimura et al. | 501/54 |
| 5,574,820 | 11/1996 | Griscom | 385/142 |
| 5,616,159 | 4/1997 | Araujo et al. | 65/17.4 |
| 5,668,067 | 9/1997 | Araujo et al. | 501/54 |
| 5,679,125 | 10/1997 | Hiraiwa et al. | 65/397 |

FOREIGN PATENT DOCUMENTS

| 401 845 | 12/1990 | (EP) |
| 691 312 | 1/1996 | (EP) |
| 737 654 | 10/1996 | (EP) |
| 60-90853 | 5/1985 | (JP) |
| 62-143844 | * 6/1987 | (JP) |
| 3-23236 | 1/1991 | (JP) |
| 4-342436 | 11/1992 | (JP) |
| 5-32432 | 2/1993 | (JP) |
| 5-147966 | 6/1993 | (JP) |
| 5-288942 | 11/1993 | (JP) |
| 6-16449 | 1/1994 | (JP) |

(List continued on next page.)

OTHER PUBLICATIONS

Tohmon, et al., "Resistance to Radiation Damage in Optical Fibers Treated with Hydrogen and X–ray Irradiated". No Month 1985.

Database Compendex Engineering Information, Inc., New York, NY US Nagasawa, et al: "Improvement of Radiation Resistance of Optical Fibers With Hydrogen And gamma–Ray Irradiation Treatments" XP002102769 abstract & Proceedings of the Eighteenth Symposium on Electrical Insulating Materials, Tokyo, JPN, 1985, pp. 321–324, Proceedings of the Symposium on Electrical Insulating Materials 18th 1985 Inst of Electrical Engineers of Japan, Tokyo, Jpn.

*Primary Examiner*—David R Sample
(74) *Attorney, Agent, or Firm*—McDermott, Will & Emery

(57) ABSTRACT

A process of manufacturing a silica glass article comprising the steps of: (1) irradiating a silica glass article with electromagnetic waves to generate defects therein; and (2) immersing the thus irradiated silica glass article in an atmosphere comprising a hydrogen gas, thereby providing the resulting silica glass article with a characteristic that is effective for preventing it substantially from increasing its absorption within an ultraviolet region due to ultraviolet ray irradiation. Also disclosed are a silica glass article or a glass fiber produced according to the manufacturing process.

5 Claims, 9 Drawing Sheets

FOREIGN PATENT DOCUMENTS

| | | |
|---|---|---|
| 7-300325 | 11/1995 | (JP) . |
| 9-124337 | 5/1997 | (JP) . |
| 09-124337 * | 5/1997 | (JP) . |
| 09-278478 * | 10/1997 | (JP) . |
| 2821074 * | 11/1998 | (JP) . |
| 97/16382 | 5/1997 | (WO) . |

* cited by examiner

FIG.4
 GLASS NETWORK STRUCTURE
Si : O = 1 : 2
---
OXYGEN-DEFICIENT TYPE
E' CENTER
B₂ CENTER
EXCESSIVE OXYGEN TYPE
NBOHC
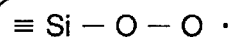
PEROXIDE RADICAL
PEROXIDE BOND
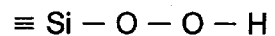
HYDROPEROXYL
---
STRUCTURE FORMED BY TERMINATING DEFECTS WITH HYDROGEN
HYDRIDE PAIR
HYDROXYL PAIR

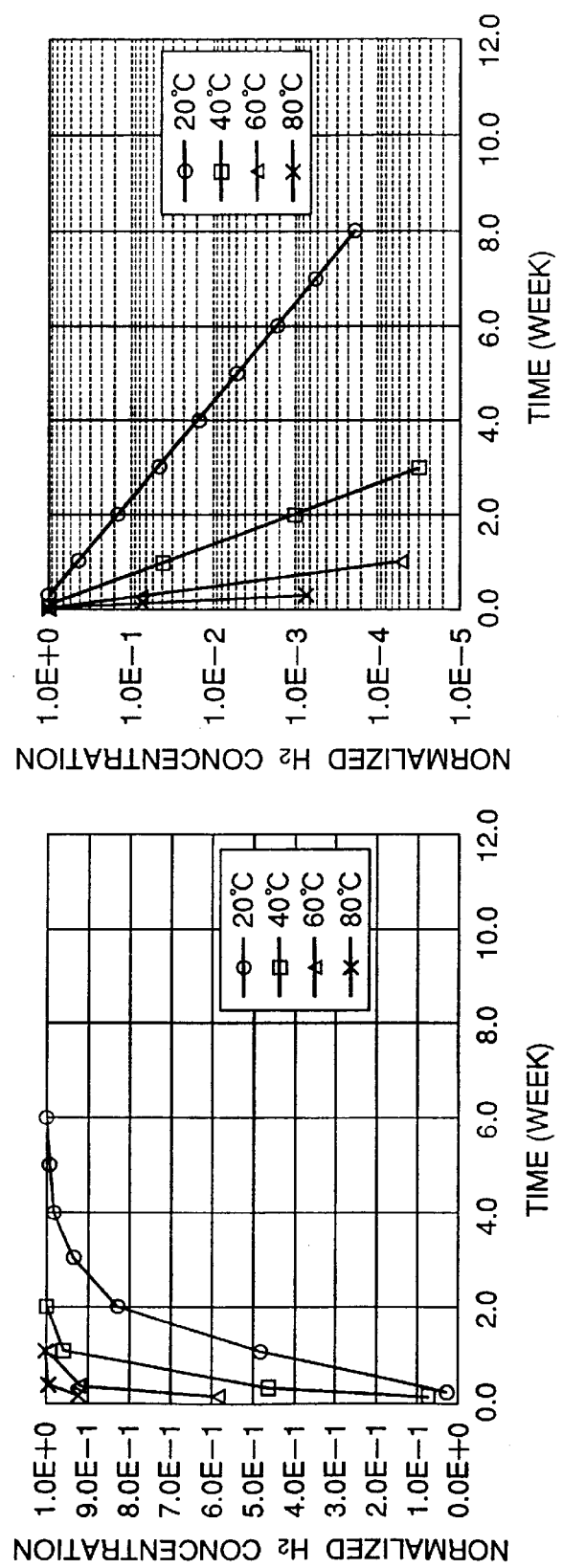

SILICA GLASS ARTICLE AND MANUFACTURING PROCESS THEREFOR

CROSS-REFERENCE

This application is a Continuation In Part of application Ser. No. 09/080,247 filed May 18, 1998, now U.S. Pat. No. 5,983,673.

BACKGROUND OF THE INVENTION

1. Field of Invention

The present invention relates to a silica glass article and a manufacturing process therefor. More particularly, the invention relates to a silica glass article including an optical fiber suitable for use in an ultraviolet region, having an excellent initial transmission characteristic and capable of preventing increase in a transmission loss occurring due to ultraviolet ray irradiation, and to a manufacturing process therefor. The industrial utility of ultraviolet rays having a wavelength of 160 nm to 300 nm has increased in industrial fields of photolithography, a laser process, sterilization, disinfection and the like. A silica glass article according to the present invention is free from substantial deterioration caused by ultraviolet ray irradiation and can be advantageously be used in such fields.

2. Description of Related Art

Silica glass articles have been used as light transmitting mediums, such as optical fibers and various optical elements. In particular, use of the optical fibers having advantages of light weight, small diameter and no induction, has recently been widened in various industrial fields including communication, image transmission and energy transmission. As one of the fields, use of the optical fiber to transmit ultraviolet rays has been expected in the medical and precise processing fields. However, when glass is irradiated with ultraviolet rays, it deteriorates and its transmission loss increases. That is, there arises a problem in that deterioration takes place because of ultraviolet ray irradiation. Since the transmission loss of a silica optical fiber having the silica glass as the core thereof is smaller than that of an optical fiber made of multicomponent type glass, the silica optical fiber is a preferred element to transmit ultraviolet rays. However, the problem of the deterioration which takes place because of ultraviolet ray irradiation remain unsolved.

It is possible for light transmission in silica glass to be superior to that in air if the wavelength is not longer than 200 nm. The reason for this is that dissociation of oxygen gas takes place because of ultraviolet ray irradiation in air. Therefore, a high transmission can be expected if the deterioration which takes place because of ultraviolet ray irradiation can be reduced in the wavelength region not longer than 200 nm.

It has been considered that the deterioration which takes place because of ultraviolet ray irradiation is mainly attributed to a defect in glass. In the present invention, the "defect in glass" means a broken portion of the glass network structure or a portion of the glass network structure that is stretched due to a distortion of the glass and is apt to break easily. FIG. 4 shows a plurality of examples of reported defects in glass of silica glass. As representative defects in glass, defects related to E' center ($\equiv$Si•) and oxygen-deficient type defects ($\equiv$Si—Si$\equiv$) are exemplified. The above-mentioned defects in glass absorb ultraviolet rays at wavelengths of 163 nm, 215 nm and 245 nm. It has been considered that the foregoing defects in glass occur in a glass synthesized in an atmosphere somewhat lacking in oxygen, or in a glass having a low concentration of OH groups.

As a technique for reducing deterioration due to ultraviolet ray irradiation of silica glass, a technique has been disclosed in JP-A-5-147966 (hereinafter referred to as Document (1)) (The term "JP-A" used herein means an unexamined published Japanese patent application), in which the content of OH groups in a pure silica core is adjusted to from 10 ppm to 1000 ppm, the contents of F (fluorine) is adjusted to from 50 ppm to 5000 ppm and the contents of Cl (chlorine) is adjusted to substantially zero. An optical fiber thus obtained has an excellent initial characteristic of transmitting ultraviolet rays and is capable of reducing deterioration due to ultraviolet ray irradiation because fluorine is contained in a specific amount.

There are several known techniques that are not aimed to improve deterioration due to ultraviolet ray irradiation but are related to an improvement in radiation resistance of a fiber for transmitting visible rays or near infrared rays. For example, JP-A-60-90853 (hereinafter referred to as "Document (2)"), has suggested a process in which any one of a glass soot body, a transparent glass preform and an optical fiber is processed in a hydrogen atmosphere to delete defects in the glass so as to improve the radiation resistance of the optical fiber. In the foregoing document, only a result of measurement of an increase in the loss experienced with respect to a near infrared rays having a wavelength of 1.3 $\mu$m is described. In addition, the effect of improving the ultraviolet ray resistance obtained by the above-mentioned process disappears within about two months.

In "Improvement in Radiation Resistance of Optical Fiber by Hydrogen Treatment and γ-Ray Irradiation", Tomon, Nagasawa, et al. pp. 1–213, Vol. 1, papers for lectures in National Conference of Semiconductor and Its Material Section of Electronic Communication Society, 1985, issued in 1985 by Electronic Communication Society (hereinafter referred to as "Document (3)"), a process has been reported for the purpose of preventing increase in light absorption of a pure silica-core optical fiber at a wavelength of 630 nm (visible ray) occurring due to γ-ray irradiation. In this document, two-step treatment for an optical fiber is performed. In the first step, an optical fiber is doped with hydrogen molecules and then, in the second step, is irradiated with γ-rays. Thus, seeds (precursors) of defects in the glass are converted into defects that absorb photon energy of a 2 eV band. Then, hydrogen previously dispersed in the fiber in the previous step and the defects in glass are chemically bonded to each other so as to improve the radiation resistance in the visible ray region. Also in the Document (3), there is no description about the characteristic of the fiber against ultraviolet rays.

U.S. Pat. No. 5,574,820 (hereinafter referred to as "Document (4)"), suggests an optical fiber and its manufacturing process that serves as a means for preventing increase in a loss in a visible ray region when a pure silica core fiber is used as an image fiber for transmitting visible rays in a radiation field. The proposed optical fiber is manufactured by previously irradiating pure silica core fiber with radiation in a large dose of $10^5$ Gy or greater, so that increase in the loss in a visible ray region having a wavelength of from 400 nm to 700 nm does not exceed 30 dB/km. Moreover, a process for manufacturing the optical fiber has been suggested, but the characteristic in the ultraviolet ray region has not been described.

JP-A-5-288942 (hereinafter referred to as "Document (5)), as in Document (4), has suggested a process for improving radiation resistance of an image fiber for transmitting visible rays. In the process, an image fiber is irradiated with g-rays in a large dose of $10^7$ Roentgen to $10^9$ Roentgen ($10^5$ Gy to $10^7$ Gy) and then is heated in a hydrogen atmosphere. Also no description about the characteristic in the ultraviolet ray region has been made in the above-mentioned document.

In the Document (2), hydrogen is added so that the radioactive resistance of the optical fiber in the near infrared rays is improved. Recently there have been disclosed several processes in which hydrogen molecules are added to silica glass in an attempt to improve ultraviolet ray resistance. For example, JP-A-3-23236 (hereinafter referred to as "Document (6)") suggests silica glass in which OH groups are contained in an amount of 100 ppm or higher, substantially no oxygen defect exists and hydrogen gas is contained, so that ultraviolet ray resistance is improved. JP-A-5-32432 (hereinafter referred to as "Document (7)") suggests a process, in which deterioration due to ultraviolet ray irradiation is prevented by controlling the concentration of hydrogen in silica glass to $1.5 \times 10^{17}$ molecules/cm$^3$ or higher. Moreover, the concentration of chlorine is made to be 100 ppm or lower to reduce hydrogen consumption in glass when ultraviolet ray irradiation is performed so as to maintain ultraviolet ray resistance. JP-A-6-16449 (hereinafter referred to as "Document (8)") suggests silica glass which has improved ultraviolet ray resistance by designing to contain OH group in an amount of 100 ppm or lower and chlorine in an amount of 200 ppm or lower, and to have a hydrogen concentration of $10^{16}$ molecules/cm$^3$ or lower, a refractive index fluctuation of $5 \times 10^{-6}$ or lower and a birefringence of 5 nm/cm or lower. U.S. Pat. No. 5,668,067 (hereinafter referred to as "Document (9)") suggests silica glass in which the amount of OH groups is 50 ppm or smaller and hydrogen is contained by at least $10^{18}$ molecules/cm$^3$ and which is free from optical damage if the silica glass is irradiated with $10^7$ pulses of KrF laser, the output of which is 350 mJ/cm$^2$. U.S. Pat. No. 5,679,125 (hereinafter referred to "Document (10)") suggests silica glass which has improved ultraviolet ray resistance because hydrogen molecules are added to silica glass to which fluorine has been added.

JP-A-7-300325 (hereinafter referred to as "Document (11)") suggests a process which is able to improve ultraviolet ray resistance by means similar to that suggested in Document (5) in such a manner that hydrogen-molecule-contained silica glass is irradiated with γ-rays so as to make the concentration of hydrogen in the irradiated silica glass to be $5 \times 10^{16}$ molecules/cm$^3$ or higher so that the ultraviolet ray resistance is improved. JP-A-9-124337 (hereinafter referred to as "Document (12)") suggests a process with which the ultraviolet ray resistance is improved by irradiating glass containing hydrogen molecules at a concentration of from $2 \times 10^{17}$ molecules/cm$^3$ to $5 \times 10^{19}$ molecules/cm$^3$ with ultraviolet rays of 150 nm to 300 nm for 20 hours or longer.

The Document (1) discloses an optical fiber having an excellent initial transmission characteristic of ultraviolet rays. However, a satisfactory effect cannot be obtained to prevent the deterioration due to ultraviolet ray irradiation. On the contrary, absorption caused at the absorption edge of ultraviolet rays is enlarged undesirably. Therefore, adjustment of an optimum amount of addition cannot easily be achieved.

No description has been made about the deterioration due to ultraviolet ray irradiation in each of the Documents (2) to (5) relating to improvement in the radiation resistance required for transmitting near infrared rays. As described later, the processes adapted to a fiber for transmitting visible rays or a fiber for transmitting near infrared rays cannot maintain the effect to prevent deterioration due to ultraviolet ray irradiation for a required period of time. Moreover, unsuitable means for an optical fiber for transmitting ultraviolet rays have been employed.

The processes disclosed in the Documents (6) to (11) are arranged in such a manner that the contents of OH groups, F or Cl are adjusted. Although the above-mentioned adjustment of the components attains an effect of initial defects in glass, a satisfactory effect cannot be attained to reduce defects induced by ultraviolet rays.

The hydrogen treatment employed in the processes disclosed in Documents (6) to (12) is such that the defects in glass caused by ultraviolet ray irradiation and the hydrogen molecules dispersed in the glass by the hydrogen treatment are bonded to each other so that increase in absorption of light is restrained. The restraining period, however, is limited to a period of time in which hydrogen molecules remain in the glass. Since the processes disclosed in the Documents (6) to (12) are mainly adapted to a bulk-form glass member, the volume of the glass member is sufficiently large with respect to the velocity at which hydrogen in the glass is dispersed. It is considered that hydrogen molecules remain in the member for a long time and thus ultraviolet ray resistance can be maintained.

If the techniques in the Documents (6) to (12) are adapted to an optical fiber, hydrogen is undesirably dispersed out the outside in a short time. Thus, there arises a problem in that the ultraviolet ray resistance cannot be maintained. That is, hydrogen molecules in an optical fiber (having an outer diameter of 125 mm) are generally gradually discharged to the outside of the optical fiber at a room temperature and the concentration is lowered to about 1/10000 in about two months as shown in FIG. 6. That is, the above-mentioned restraining effect is effective in only about two months after the hydrogen treatment has been performed. Therefore, increase in the absorption cannot be restrained for a long time with the conventional techniques.

SUMMARY OF THE INVENTION

In view of the foregoing, an object of the present invention is to provide a silica glass article for use as an optical fiber or a bundle fiber for transmitting ultraviolet rays, having an excellent transmission characteristic of ultraviolet rays and exhibiting a satisfactory resistance against deterioration due to ultraviolet ray irradiation.

Another object of the present invention is to provide a silica glass article substantially free from considerable deterioration even if irradiated with ultraviolet rays having a wavelength not longer than 200 nm and having superior light transmission as compared to that in air.

Another object of the present invention is to provide a silica glass fiber having a sufficient resistance against deterioration due to ultraviolet ray irradiation and to provide a method of producing the same without damaging its coating.

Still another object of the present invention is to provide a silica glass article having excellent resistance against deterioration due to ultraviolet ray irradiation.

A still further object of the present invention is to provide a manufacturing process for the foregoing silica glass articles.

Other objects and effects of the present invention will become apparent from the following description.

The above described objects of the present invention have been achieved by providing a process of manufacturing a silica glass article comprising the steps of:

(1) irradiating a silica glass article with electromagnetic waves to generate defects therein; and (2) immersing the thus irradiated silica glass article in an atmosphere comprising a hydrogen gas, thereby providing the resulting silica glass article with a characteristic that is effective for preventing it substantially from increasing its absorption within an ultraviolet region due to ultraviolet ray irradiation.

The electromagnetic waves can be ultraviolet rays, vacuum ultraviolet rays, X rays or γ rays having a photon energy of not less than 3.5 eV with which defects in glass can be generated.

An advantageous dose of the electromagnetic waves for irradiation is from 10 Gy to $10^4$ Gy.

Step (2) is advantageously carried out when the partial pressure of the hydrogen gas is from 0.5 atm to 10 atm and the temperature is not lower than room temperature.

The process can include the additional step of (3) irradiating again the silica glass article that has been subjected to the step (2), with electromagnetic waves while hydrogen molecules remain therein.

It is advantageous for the silica glass article to contain hydrogen molecules at a concentration of not lower than $1 \times 10^{16}$ molecules/$cm^3$ at the beginning of the step (3).

After the step (3), an additional step (4) can be carried out for reducing the hydrogen molecules that are remaining in the silica glass article to not higher than $1 \times 10^{16}$ molecules/$cm^3$.

The above-described process of manufacturing a silica glass article is advantageously applied to manufacturing an optical fiber. Step (2) is advantageously carried out at a partial pressure of the hydrogen gas of from 0.5 atm to 10 atm and at a temperature in a range from room temperature to a highest temperature with which coating on the optical fiber is not damaged. Step (2) should be carried out at a temperature of from 80° C. to 200° C.

The optical fiber can be a bundle fiber formed by bundling a plurality of optical fibers or an optical fiber for a bundle fiber before wound.

According to another aspect of the invention, there is provided a silica glass article which is manufactured by a process comprising the steps of:

(1) irradiating a silica glass article with electromagnetic waves to generate defects therein; and (2) immersing the thus irradiated silica glass article in an atmosphere comprising a hydrogen gas, thereby providing the resulting silica glass article with a characteristic that is effective for preventing it substantially from increasing its absorption within an ultraviolet region due to ultraviolet ray irradiation;

The process can include a further step of (3) irradiating again the silica glass article that has been subjected to the step (2), with electromagnetic waves while hydrogen molecules remain therein.

The process can further include after the step (3), a step of (4) reducing the hydrogen molecules that are remaining in the silica glass article to not higher than $1 \times 10^{16}$ molecules/$cm^3$ by allowing to stand in the atmosphere or by heating at 80° C. or lower.

This invention also provides an optical fiber comprising a core and a clad having a refractive index lower than that of the core, the optical fiber having the characteristic that when $10^8$ pulses of KrF excimer laser having a wavelength of 248 nm are applied to the optical fiber, as ultraviolet ray irradiation for an evaluation of ultraviolet resistance, at an output of 10 mJ/$cm^2$ and a pulse frequency of 100 Hz, the optical fiber as measured with a sample of one meter length has a transmittance of not less than 90% of the transmittance measured prior to the irradiation in a wavelength region of ultraviolet ray from 160 nm to 300 nm.

The process can further include a step of (3) irradiating again the optical fiber that has been subjected to the step (2), with electromagnetic waves while the hydrogen molecules that are remaining in the optical fiber is not lower than $1 \times 10^{16}$ molecules/$cm^3$, so as to impart the characteristic that when $10^8$ pulses of KrF excimer laser having a wavelength of 248 nm are applied to the optical fiber, as ultraviolet ray irradiation for an evaluation of ultraviolet resistance, at an output of 10 mJ/$cm^2$ and a pulse frequency of 100 Hz, the optical fiber as measured with a sample of one meter length has a transmittance of not less than 90% of the transmittance measured prior to the irradiation at a wavelength of 248 nm.

The process can further include after the step (3), a step of (4) reducing the hydrogen molecules that are remaining in the optical fiber to not higher than $1 \times 10^{16}$ molecules/$cm^3$ by allowing to stand in the atmosphere or by heating at 80° C. or lower. The core of the optical fiber can include high-purity silica glass containing fluorine. The core of the optical fiber can include high-purity silica glass which contains OH groups in an amount of not less than 100 ppm and which does not contain more than 1 ppm of Cl. The high-purity silica glass advantageously further contains OH groups in an amount less than 100 ppm. The optical fiber can be a bundle fiber formed by bundling a plurality of glass fibers.

That is, according to the present invention, there can be provided an optical fiber having the characteristic that when $10^8$ pulses of KrF excimer laser having a wavelength of 248 nm are applied to the optical fiber, as ultraviolet ray irradiation for an evaluation of ultraviolet resistance, at an output of 10 mJ/$cm^2$ and a pulse frequency of 100 Hz, the optical fiber as measured with a sample of one meter length has a transmittance of not less than 90% of the transmittance measured prior to the irradiation in a wavelength region of ultraviolet ray from 160 nm to 300 nm.

Furthermore, according to the present invention, there can be provided an optical fiber having the characteristic that when $10^8$ pulses of KrF excimer laser having a wavelength of 248 nm are applied to the optical fiber, as ultraviolet ray irradiation for an evaluation of ultraviolet resistance, at an output of 10 mJ/$cm^2$ and a pulse frequency of 100 Hz, the optical fiber as measured with a sample of one meter length has a transmittance of not less than 90% of the transmittance measured prior to the irradiation at a wavelength of 248 nm.

In a preferred embodiment, the electromagnetic waves for use in step (3) is KrF or ArF excimer laser. When the KrF laser beam is used in step (3), the irradiation is preferably performed in such a manner that $10^6$ to $10^7$ pulses are applied at 1 mJ/$cm^2$/pulse to 200 mJ/$cm^2$/pulse. Moreover, step (4) is performed in such a manner that the silica glass article is heated at a temperature from room temperature to 80° C.

In another preferred embodiment of the present invention, the optical fiber comprises a core comprising a high purity silica glass, and a clad comprising a high purity silica glass containing fluorine. In addition, the optical fiber according to the present invention preferably comprises a core comprising a high purity silica glass and containing substantially no dopant for adjusting refractive index.

BRIEF DESCRIPTION OF THE DRAWINGS

FIG. 4 is a diagram showing a plurality of examples of defects in glass.

FIG. 6(a) is a graph showing changes in the concentration of hydrogen with time at the center of an optical fiber having a diameter of 125 μm upon doping the optical fiber with hydrogen at various temperatures.

FIG. 6(b) is a graph showing changes in the concentration of hydrogen with time at the center of an optical fiber having a diameter of 125 μm in the stage where hydrogen is discharged from the optical fiber at various temperature.

DETAILED DESCRIPTION OF THE INVENTION

Figure 1:
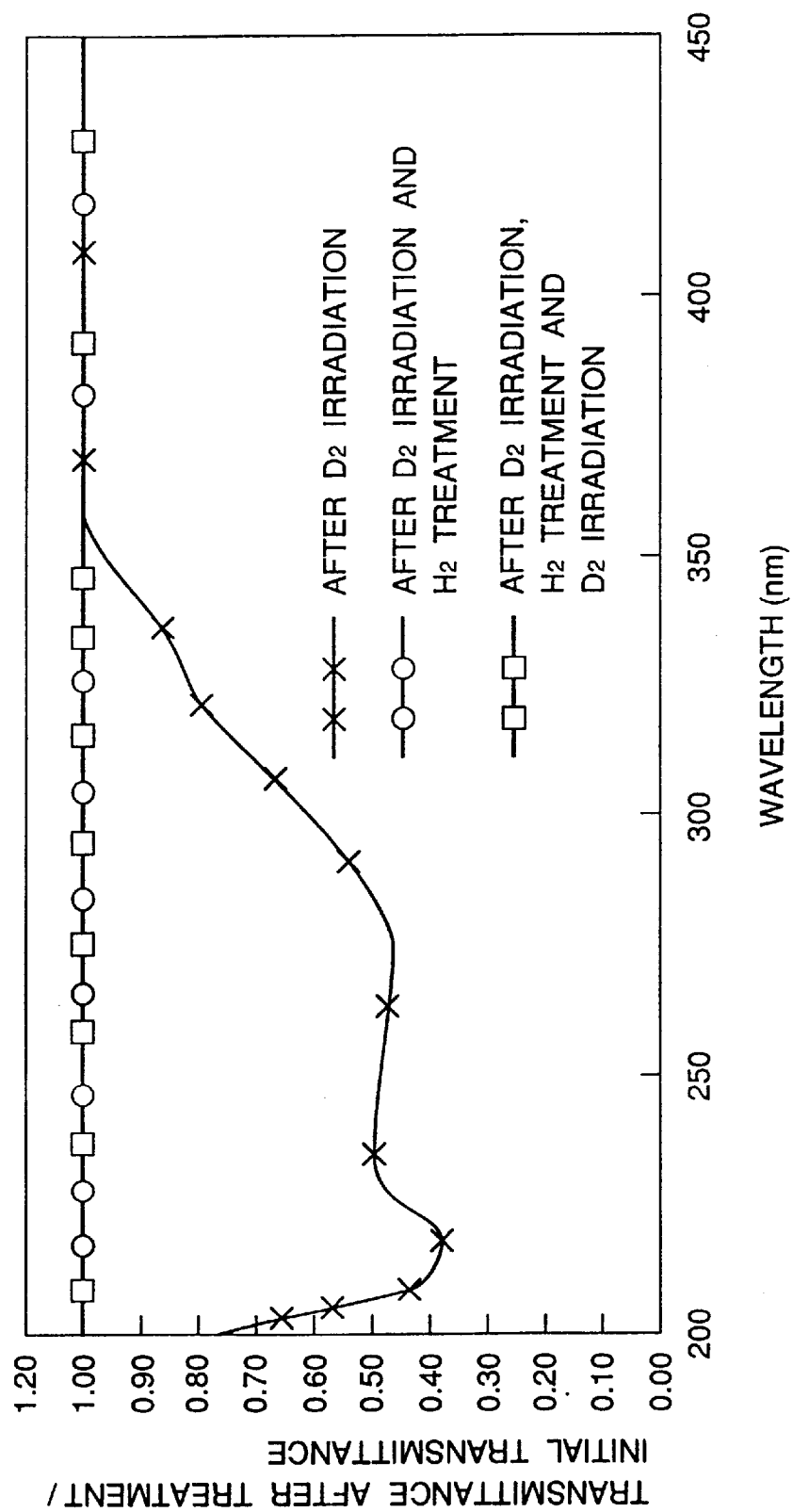
FIG. 1 shows the transmission spectra, as normalized by the initial transmission spectrum, of a silica glass article according to Example 1 after it has been subjected to the respective treatments.

In the present invention, a silica glass article which is used as a raw material is irradiated with electromagnetic waves under specific irradiation condition so as to convert all of precursors which can be formed into defects in glass (hereinafter sometimes simply referred to "defects") into defects (step (1)), and then subjected to a hydrogen treatment (step (2)). A silica glass article thus obtained does not deteriorate any longer in subsequent ultraviolet ray irradiation.

According to the present invention, if step (3) is performed, namely if the silica glass article that has been subjected to step (2) is irradiated again with electromagnetic waves while hydrogen molecules remain therein, the effects obtained by steps (1) and (2) are further ensured.

Also, the silica glass article subjected to step (3) may be subjected to step (4) in which the silica glass article is heated to remove hydrogen molecules from the glass.

As described earlier, adjustment of the contents of OH groups, F and Cl as disclosed in Document (1) is effective to improve the initial transmission characteristic but is not effective for preventing its deterioration caused by ultraviolet ray irradiation. On the other hand, the hydrogen treatment disclosed in Document (2) can improve the initial resistance against radiation but cannot prevent increase in light absorption for a sufficient period of time. According to the results of experiments performed on optical fibers by the inventors of the present invention, similar results were also obtained with respect to deterioration due to ultraviolet ray irradiation.

The reason for this is considered to be as follows. Hydrogen molecules are dispersed in glass as a result of the hydrogen treatment and then bonded with defects in glass generated by irradiation, to thereby prevent increase in absorption of ultraviolet rays. However, the hydrogen molecules are usually dispersed if the glass is allowed to stand at room temperature. As a result, hydrogen molecules are discharged from the glass in about two months. Thus, the effect of preventing deterioration due to ultraviolet ray irradiation becomes lost.

To prevent deterioration due to ultraviolet ray irradiation for a long time by the process disclosed in Document (2), a countermeasure must be taken in which the hydrogen treatment is repeated or hermetic coating or the like is performed to prevent dispersion and discharge of the hydrogen. However, there arises a problem in that such a repeated treatment makes it impossible to continuously use a fiber, and that applying such a hermetic coating is disadvantageous for productivity.

Document (2) discloses that the loss and deterioration resistance in the visible ray region may sometimes be prevented if a base member of transparent glass which is not the fiber is subjected to heat drawing and irradiation with radiation prior to the hydrogen treatment. Although experiments were performed, no effect was attained to prevent increase in the loss in the ultraviolet ray region. That is, if the drawing process is performed after the transparent glass perform has been subjected to the above-mentioned treatments, the effect obtainable from the previous process cannot be obtained.

Document (3) has reported experiments in which a hydrogen treatment is conducted and then an ultraviolet ray irradiation is performed to convert existing precursors into defects so as to be bonded to hydrogen dispersed by the previous step, followed by a further hydrogen treatment and a heating treatment. However, the above-mentioned process is too complicated because the hydrogen treatment must be performed two times.

On the other hand, the effect of preventing deterioration due to ultraviolet ray irradiation according to the process disclosed in Document (4) was investigated. As a result, the inventors of the present invention have found that an undesirable increase not smaller than 30 dB/km takes place if an optical fiber is previously irradiated with radiation in a great dose not smaller than $10^5$ Gy.

Irradiation of radiation not smaller than $10^5$ Gy encounters a difficulty that a large amount of optical fibers cannot be processed at a time because of limitation of the irradiation condition. Therefore, satisfactory productivity cannot be realized. Another fact was found that there arises a problem in that the mechanical strength of the fiber deteriorates because the ultraviolet curing resin employed to coat a usual optical fiber deteriorates when it is irradiated with radiation.

Also the process disclosed in Document (5) uses irradiation with a large dose, and hence suffers from the problem of the increases in the loss and deterioration of coatings. According to the experiments by the inventors of the present invention, the process disclosed in Document (5) was not suitable for manufacturing the optical fiber for ultraviolet rays.

The inventors of the present invention made the following hypothesis. That is, the hydrogen treatment in the conventional process changes initial defects related to E' centers and $B_2$ centers into stable Si—H bonds. However, no process is performed to prevent E' centers newly generated from precursors because of ultraviolet ray irradiation after the hydrogen treatment. Thus, conversion of the newly generated E' centers into Si—H bonds cannot be performed, and absorption of ultraviolet rays increases. As a result of experiments based on such hypothesis, the present inventors have found that performing a "pre-treatment (defect-generating treatment) prior to a hydrogen treatment" is very effective to prevent increase in the loss and deterioration due to ultraviolet ray irradiation. As a result of various investigations, a surprising fact was found that the above described pre-treatment is effective in case where electromagnetic waves are applied in not such a great quantity of doses as disclosed in Documents (4) and (5). Thus, the present invention was completed.

That is, the present invention is arranged in such a manner that a silica glass article is first irradiated with a predetermined quantity of electromagnetic waves and then subjected to a hydrogen treatment, contrary to the processes disclosed in Documents (2) and (3).

The pre-treatment according to the present invention enables an optical fiber to be free from increase in the absorption of ultraviolet rays and enables the ultraviolet curing resin or the like employed as the coating to be free from deterioration. In addition, two times of hydrogen treatment as employed in the process disclosed in Document (3) are not necessitated. Therefore, advantages can be obtained in terms of the cost for apparatuses and the time required to manufacture the optical fiber. As a matter of course, the manufacturing cost can be reduced.

With regard to the considerable difference in the dose to obtain the above-mentioned effect between the glass article for ultraviolet rays according to the present invention and the fiber for visible ray disclosed in Documents (4) and (5), the present inventors consider it as attributed to the difference in terms of defects in glass affecting the deterioration.

As to the glass article for ultraviolet rays, defects which cause absorption in the wavelength region not longer than 300 nm must be removed. Si• defects cause absorption at 215 nm, and its precursors at 163 nm and 245 nm, respectively. Therefore, a key of the present invention is reduction of the Si• (E' center) and its precursors, specifically, a process of removing the precursors and a process of terminating the defects by hydrogen or the like so as to render the defects harmless.

Precursors can be removed by: (a) a process in which glass is brought to an oxygen-rich state to prevent generation of Si—Si bonds so as to control the composition in such a manner that Si• defects are decreased and SiO• defects are generated; and (b) a process in which the number of Si—Cl bonds is decreased because Si—Cl is dissociated by ultraviolet rays. The terminating of defects may be performed by converting Si• into Si—OH, Si—H or Si—F.

However, generation of Si• could not be decreased when the preliminary irradiation of electromagnetic waves according to the present invention was not performed. The reason for this is considered as attributed to the structure of glass. That is, precursors, such as Si••OSi and Si—Si, are considered to be inactive and therefore unable to react with hydrogen. Therefore, it is necessary to break these bonds beforehand. The inventors of the present invention have found that as an effective means for performing such breakage, it is useful to employ irradiation of electromagnetic waves, such as γ-rays, ultraviolet rays or the like in an intermediate dose or smaller so that bonds of precursors may be broken but breaking of normal Si—O—Si bonds may be minimized. In the present invention, it is essential to perform the hydrogen treatment following the above-mentioned breaking of precursor bonds.

It is assumed that according to the present invention substantially all of precursors of E' center such as oxygen deficient defects and stretched Si—O—Si bonds are converted into E' centers by irradiation of electromagnetic waves at a quantity of not more than $10^4$ Gy. Then, a hydrogen treatment of a deuterium treatment is performed so that all of the E' centers are converted into stable Si—H bonds or Si—D bonds. Even if ultraviolet ray irradiation is performed after hydrogen (deuterium) has been removed from the glass subjected to the hydrogen treatment or the deuterium treatment, further generation of E' center can be prevented because no precursor exists in the glass. Thus, the increase of absorption can be prevented.

As for a fiber for visible rays, defects which cause light absorption in a wavelength not shorter than 400 nm must be removed. The SiO• defect has a large absorption band in the vicinity of 600 nm, which must be rendered to be harmless. In this case, either of the following processes may be considered: (a) a base member in which the defects are converted into Si—OH is manufactured; and (b) SiO• defects are converted into Si—OH during irradiation with γ-rays and their precursors SiO—Si and Si—O—O—Si is completely broken off by using γ-rays so that all of the foregoing precursors may be converted into Si—OH.

The process disclosed in Document (4) corresponds to the process (b). To realize complete conversion to Si—OH, irradiation with γ-rays at a quantity of $10^6$ Gy is required. In this case, irradiation with γ-rays at a large dose must be performed, but addition of hydrogen is not always required.

The process according to the present invention is described in detail below. In the present invention, the ultraviolet ray region is a wavelength region from 160 nm to 300 nm unless otherwise specifically indicated.

The silica glass article which is used as the raw material according to the present invention includes all of silica glass products which are optical elements, such as optical fibers, lenses, beam splitters and the like, made of silica glass required to industrially use ultraviolet rays. The process of manufacturing a silica glass material for the silica glass article to be subjected to the process of the present invention is not particularly limited.

The silica glass having a high purity for use in the present invention means glass containing no impurities, such as transition metal (i.e., Fe, Cu. Ni and the like), alkali and alkali earth metal. Each of the impurity elements, if contained, must be no more than the order of PPB.

With regard to specific materials of the silica glass article, the main component of which is silica ($SiO_2$) and it preferably contains OH groups at a concentration not lower than 100 ppm nor higher than 2000 ppm, particularly, in the regions through which ultraviolet rays are allowed to pass. The above-mentioned OH-group content of 2000 ppm is substantially an upper limit of the concentration of OH groups which can be added to glass by a usual process of manufacturing silica glass, such as a soot method or a direct method.

In some cases, fluorine (F) is preferably contained in an amount of about 1 wt %. As a dopant for changing refractive index, only F may be employed. If F is contained, the OH-group content may be lower than 100 ppm (including a OH-group content of 0 ppm).

It is significantly preferred that the amount of Cl in the core of the optical fiber or the like must be lower than 1 ppm (a case in which Cl is 0 ppm included). On the other hand, the material of a region of the optical fiber, for example, the clad, through which ultraviolet rays do not pass is free from the above-mentioned limitation.

The constitution of the refractive index distribution of the optical fiber according to the present invention is not limited particularly. The structure may be any one of a mono-core structure, a multi-core structure, a single-mode structure and a multi-mode structure. Moreover, a bundle fiber formed by bundling a plurality of optical fibers is also included in the scope of the present invention. The bundle fiber may be formed in such a manner that the process of the present invention is applied to each of optical fibers and then the optical fibers are wound. Alternatively, a bundle fiber may be first formed by bundling a plurality of optical fibers, and then the present invention may be applied to the bundle fiber.

The raw material silica glass article is initially subjected to electromagnetic wave irradiation treatment. The electromagnetic waves according to the present invention have photon energy with which defects can be generated when irradiation with ultraviolet rays (400 nm to 160 nm), vacuum ultraviolet rays (shorter than 160 nm to 1 nm), X rays (several tens of nm to 0.01 nm) or γ-rays (shorter than 0.01 nm) is performed. That is, the electromagnetic waves has photon energy of 3.5 eV or greater. The upper limit of the energy is generally 1.33 MeV which is the same as γ-ray energy of $^{60}Co$ which is widely used as a γ-ray source in the industrial field. The foregoing value is a value determined practically.

The dose of rays to be applied is generally 10 to $10^4$ Gy, preferably $10^2$Gy to $10^3$ Gy. Thus, the above-mentioned low dose is enough to obtain a satisfactory effect of preventing the deterioration due to ultraviolet ray irradiation.

As for specific irradiation means, in the case of γ-rays $^{60}CO$, $^{137}Cs$ or the like is used, and in the case of X-rays an X-ray tube equipped with W, Cu or the like as its target is used, and in the case of ultraviolet rays or vacuum ultraviolet rays a deuterium lamp, KrF excimer laser, ArF excimer laser, synchrotron orbital radiation or the like is used.

After the electromagnetic wave irradiation treatment is performed, the hydrogen treatment is performed in the present invention. The "atmosphere comprising a hydrogen gas" according to the present invention is an atmosphere composed of a pure hydrogen gas or a mixed atmosphere of a hydrogen gas, a nitrogen gas and/or inert gas in which the partial pressure of the hydrogen gas is generally from 0.1 atm to 10 atm, preferably from 0.5 atm to 10 atm. The reason why the pressure is determined as described above is as follows. If the pressure is 0.5 atm to 10 atm, substantially similar dispersion speed of hydrogen in the glass can be obtained. Moreover, the gas pressure within the above range can be easily employed when an actual production operation is performed. If the pressure exceeds 10 atm, the gas must be treated as a high-pressure gas, which is strictly regulated by laws and thus is disadvantageous in an economical viewpoint. Although a similar effect can be obtained even if the pressure is about 0.1 atm, a gas of such a pressure cannot be easily used practically.

If a deuterium gas is employed as the hydrogen gas, a similar effect can be obtained.

The temperature at which the hydrogen treatment is performed is not limited particularly. Hydrogen at a pressure of 1 atm requires about seven days to reach the center of the fiber when the temperature is room temperature. When the temperature is 80° C., one day is required. When the temperature is 200° C., about two hours are required. Therefore, a temperature of not lower than room temperature may be used. In case of an optical fiber, an upper limit of the treating temperature is substantially determined depending on the heat resistance of a coating for the fiber. In such a case, the temperature is preferably about 80° C. to 200° C. 80° C. is a temperature close to the highest temperature that does not damage ultraviolet curing acrylate resins and 200° C. is the heat resisting upper limit temperature of silicone resins. The hydrogen treating time varies depending on the hydrogen treating temperature. However, if the treating temperature is not lower than 80° C., hydrogen can be dispersed in the fiber within about two or three days to complete the treatment.

The electromagnetic wave treatment and the hydrogen treatment according to the present invention are performed so that increase in light absorption in the ultraviolet ray region occurring due to ultraviolet ray irradiation is substantially prevented. The expression "substantially prevented" used herein means that deterioration in the transmission occurring due to ultraviolet ray irradiation is not higher than 10% of the initial transmission. That is, when an initial ultraviolet ray transmission (initial transmission) is $T_0$, an ultraviolet ray transmission after irradiated with ultraviolet rays (160 nm to 300 nm) is $T_1$, and the relative transmission after the irradiation regarding $T_0$ as 100% is $T_R$ ($T_R=T_1/T_0\times100$ (%) ), a relationship $1-T_R \leq 10\%$, that is, $\{(T_0-T_1)/T_0\} \leq 10\%$ is satisfied.

According to the present invention, an optical fiber is considered free from substantial increase in light absorption due to ultraviolet ray irradiation in the ultraviolet ray region when the decrease in the ultraviolet ray transmission is not more than 10% in a wavelength region of ultraviolet ray from 160 nm to 300 nm as measured with a sample of one meter length after the following irradiation is applied for an evaluation:

Types of laser: KrF excimer laser
Wavelength: 248 nm
Number of pulse: $10^8$ pulses
Energy density: 10 mJ/cm$^2$
Pulse frequency: 100 Hz In case where a silica glass article obtained by the process according to the present invention which is substantially free from increase in light absorption in the ultraviolet ray region occurring due to ultraviolet ray irradiation is an optical fiber having a length of 1 meter, and is irradiated in such a manner that $10^8$ pulses of KrF excimer laser having a wavelength of 248 nm are applied under conditions that the output is 10 mJ/cm$^2$ and the pulse frequency is 100 Hz, the silica glass article has a difference between the initial ultraviolet ray transmission and the ultraviolet ray transmission after irradiated with ultraviolet rays not higher than 10% of the initial transmission in a wavelength region of ultraviolet rays from 160 nm to 300 nm.

Figure 3:
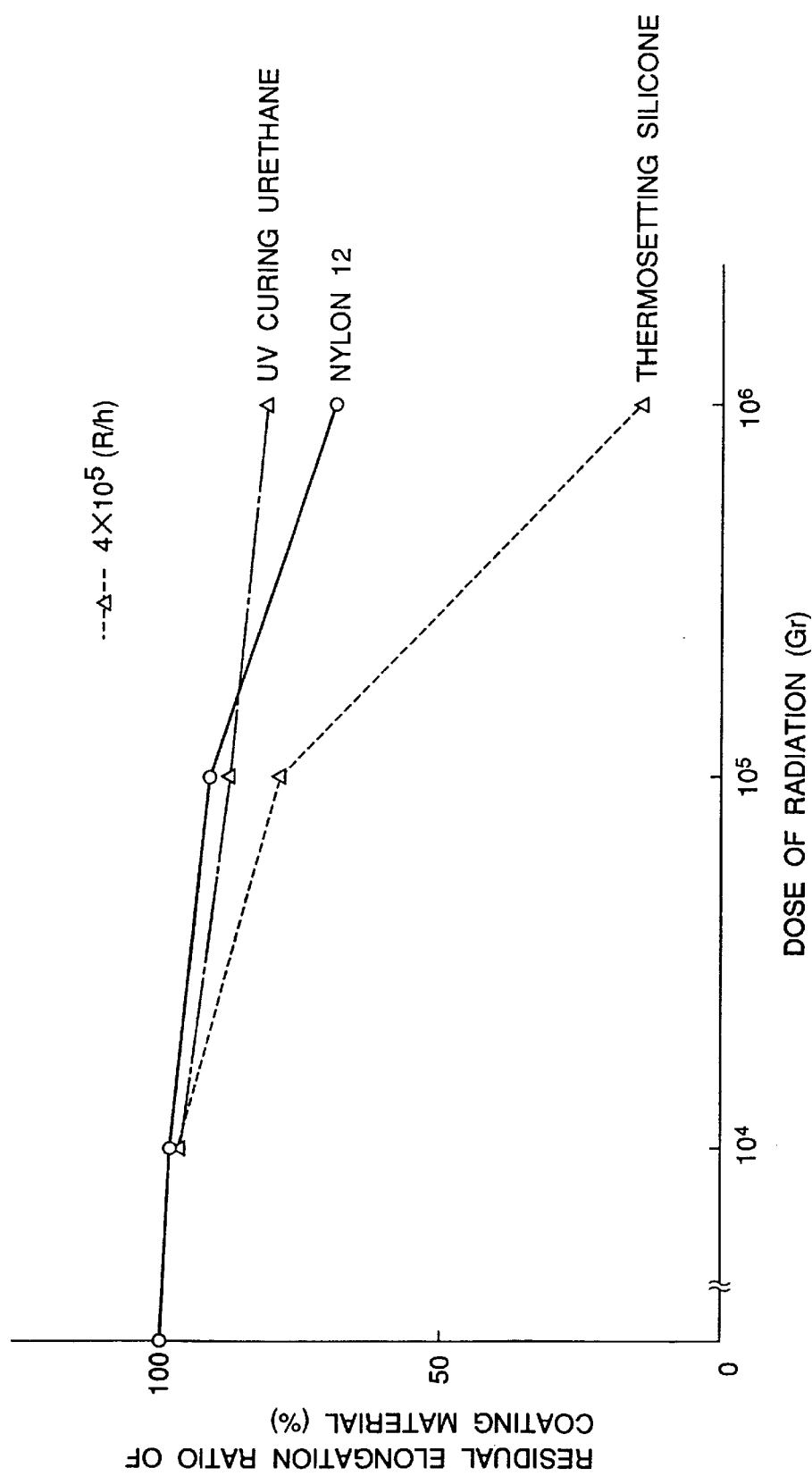
FIG. 3 is a graph showing the relationship between dose of applied radiation and a residual elongation of a coating resin.

If the silica glass article according to the present invention is an optical fiber, thermosetting silicones or ultraviolet curing urethane acrylates can be used as a primary coating, and nylons can be used as a secondary coating. In the present invention, ultraviolet curing urethane acrylates are preferably used as the primary coating because they have a high residual elongation ratio after irradiated with radiation. FIG. 3 shows the relationship between the dose of the applied radiation and the residual elongation ratio (the ratio of breaking elongation after the irradiation with respect to breaking elongation before the irradiation) of the resin. As can be understood from FIG. 3, deterioration starts if the dose exceeds $10^5$ Gy and deterioration in the coating can substantially be prevented if the dose is $10^4$ Gy or smaller which is the irradiation condition according to the present invention.

As described above, the present invention has step (1) in which unstable structures, such as oxygen-deficient type defects, in the silica glass is forcibly bonded with each other and step (2) in which the portion thus broken off is forcibly bonded with hydrogen. Hydrogen molecules introduced into a silica glass article in the form of a plate-like shape or a block shape having a relatively large size remain for a relatively long time (several years) therein. Therefore, ultraviolet rays are applied in a state in which hydrogen molecules remain in the silica glass so that the ultraviolet ray resistance is maintained.

In contrast, if the silica glass article has a small size with respect to the diffusion coefficient of hydrogen in the glass, hydrogen molecules introduced into the silica glass dissipate therefrom in a relatively short period of time. For example, if the outer diameter of the fiber is 125 $\mu$m, hydrogen molecules get out within 8 to 9 weeks. If the outer-diameter is 200 $\mu$m, hydrogen molecules get out within about 24 weeks.

FIG. 6(a) shows calculated changes in the concentration of hydrogen at the center of a glass fiber having an outer diameter of 125 $\mu$m in the course of hydrogen doping at from 20° C. to 80° C. In FIG. 6(a), the initial concentration is shown as 0 and the saturated concentration is shown as 1. The glass fiber is surrounded with the atmosphere, the hydrogen partial pressure of which is regarded as 1 atm. FIG. 6(b) also shows calculated changes in the concentration of hydrogen in the course when hydrogen dissipates from the fiber. The glass fiber is surrounded with the atmosphere, the hydrogen partial pressure of which is regarded as zero.

Figure 7B:
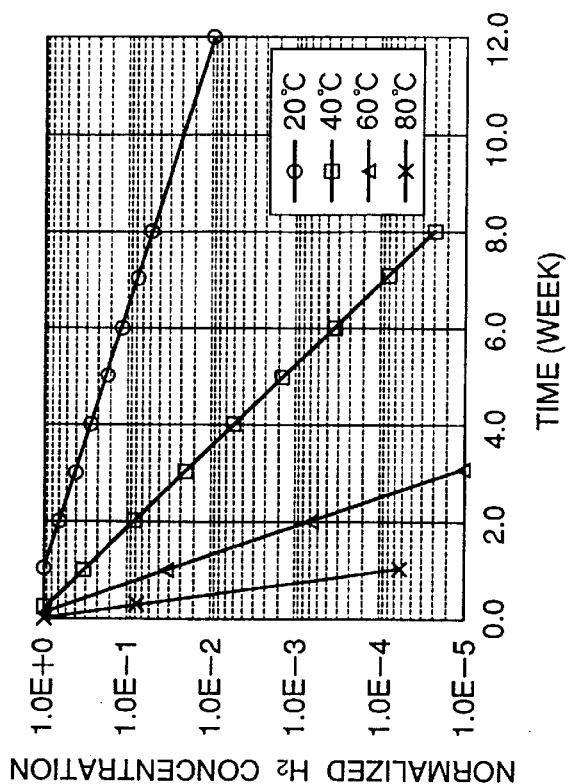
FIG. 7(b) is a graph showing changes in the concentration of hydrogen with time at the center of an optical fiber having a diameter of 200 μm in the stage where hydrogen is discharged from the optical fiber at various temperature.
Figure 7A:
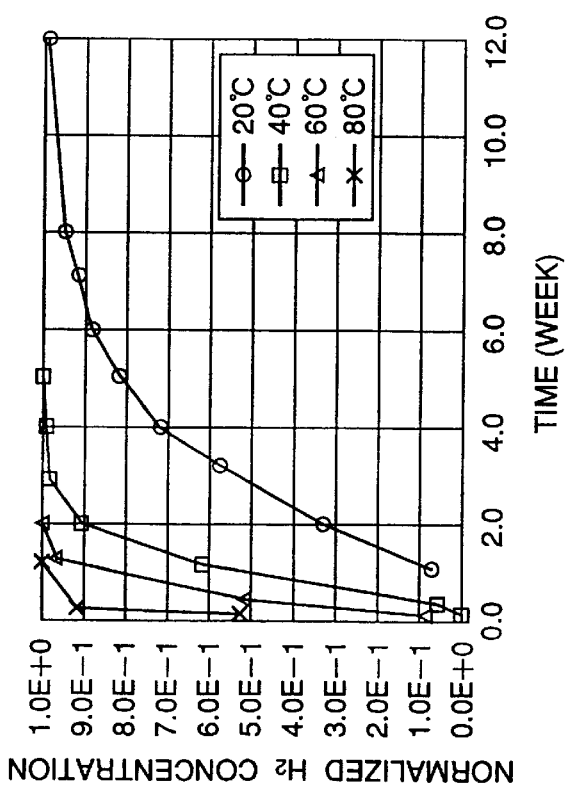
FIG. 7(a) is a graph showing changes in the concentration of hydrogen with time at the center of an optical fiber having a diameter of 200 μm upon doping the optical fiber with hydrogen at various temperatures.

In FIGS. 7(a) and (b), calculated changes in hydrogen concentration in a glass fiber having an outer diameter of 200 $\mu$m are shown in the same manner as in FIGS. 6(a) and (b).

With regard to such dissipation of hydrogen, similar results were obtained with the fibers manufactured by the conventional techniques disclosed in Documents (6) to (12).

It was found that there may be a case where a transmission loss takes place when irradiated with ultraviolet rays, even if steps (1) and (2) according to the present invention are performed. Although the reason for this has not been detected, the present inventors have considered as follows. By steps (1) and (2), moderate bonds are formed between glass and hydrogen. The bonds enables the ultraviolet ray resistance of the silica glass article to be maintained to some extent even after surplus hydrogen gets out therefrom. However, if the silica glass article is allowed to stand for a long time after step (2), hydrogen which is bonded to glass with the relatively moderate bond is eventually released. As a result, the ultraviolet ray resistance deteriorates.

The problem of the hydrogen dissipation can be solved by step (3) of the present invention in which an electromagnetic wave treatment is performed in a state in which hydrogen molecules remain in the silica glass article.

As the "state in which hydrogen molecules remain in the glass" when step (3) is performed, the concentration of hydrogen molecules in silica glass is preferably $10^{16}$ molecules/cm$^3$ or higher, more preferably $10^{16}$ molecules/cm$^3$ to $10^{20}$ molecules/cm$^3$, and most preferably $10^{18}$ molecules/cm$^3$ to $10^{20}$ molecules/cm$^3$.

The electromagnetic waves for use in step (3) of the present invention are preferably ultraviolet rays having a wavelength of 248 nm or shorter, more preferable excimer laser beams or γ-rays, and most preferably KrF excimer laser beams or ArF excimer laser beams. The conditions under which the electromagnetic waves are applied in step (3) is that the amount of irradiation is 1 to 200 mJ/cm$^2$/pulse and $10^6$ to $10^7$ pulses (about 2 hours to 3 hours in terms of period of time) are applied when KrF excimer laser beam is employed. When the ArF excimer laser beam is employed, the conditions are that the amount of irradiation is 1 to 200 mJ/cm$^2$/pulse and $10^4$ to $10^7$ pulses. The frequency of the pulses is, for example, 50 Hz to about 1000 Hz. The conditions are not limited to the above-mentioned values. Therefore, practical conditions which can be employed may be selected.

Although the mechanism of step (3) has not been clarified, the inventors of the present invention consider that irradiation with electromagnetic waves such as excimer laser beams enhances bonding between hydrogen and defects and thus the bonding is converted to further stable bond. That is, hydrogen is brought to a fixed state so that removal of hydrogen is prevented. The reason why hydrogen can be fixed by irradiation with excimer laser beams in about from 2 to 3 hours is considered that in case of excimer laser beams, strong pulses can instantaneously and concentrically be applied to the end surface of the fiber and thus energy can efficiently be used so that hydrogen is fixed. The fixation of hydrogen in step (3) is advantageous for a silica glass article having a small size, particularly, an optical fiber.

A silica glass article subjected to step (3) of the present invention causes substantially no increase in its light absorption in the ultraviolet ray region, if irradiated with ultraviolet rays. For example, in a case where $10^8$ pulses of KrF excimer laser having a wavelength of 248 nm are applied to an optical fiber, as a ultraviolet ray irradiation for an evaluation of ultraviolet resistance, at an output of 10 mJ/cm$^2$ and a pulse frequency of 100 Hz, the optical fiber as measured with a sample of one meter length has a transmittance of not less than 90% of the transmittance measured prior to the irradiation.

After hydrogen has been fixed by performing irradiation with electromagnetic waves in step (3), there may be a case where unfixed hydrogen molecules still remain in the glass. Although existence of the hydrogen molecules does not raise any problem when the glass is used in a short wavelength region, an adverse result occurs in a long wavelength region in which absorption by hydrogen molecules takes place. The hydrogen molecules (H$_2$) has an absorption band at 1.24 $\mu$m and the absorbing strength is 3.4 dB/km with the concentration of $1 \times 10^{18}$ molecules/cm$^3$ and 0.03 dB/km with the concentration of $1 \times 10^{16}$ molecules/cm$^3$.

To remove the unfixed hydrogen molecules in the glass, there may be employed a heating treatment as step (4). It is preferred that the heating is performed at a temperature of, for example, from room temperature to 80° C., so as to make the concentration of hydrogen molecules remaining in the silica glass article that has been subjected to step (4) to be $1 \times 10^{16}$ molecules/cm$^3$ or lower. The unfixed hydrogen can also be removed by merely allowing the silica glass article to stand in the atmosphere.

The value of hydrogen concentration in the silica glass can be obtained by Raman analysis disclosed in Zurnal Pril; adnoi Spektroskopii Vol. 46 No. 6 pp. 987–991 June 1987 (Document (13)) in accordance with the equation about the intensity ratio of the intensity of a Raman band of SiO$_2$ having a wavelength of 800 cm$^{-1}$ and that of hydrogen molecules in the synthesis silica glass at a wavelength of 4135 cm$^{-1}$.

A silica glass article subjected to step (4) of the present invention causes substantially no increase in its light absorption in the ultraviolet ray region, if irradiated with ultraviolet rays. For example, in the case where an optical fiber having a length of 1 m is irradiated in such a manner that $10^8$ pulses of KrF excimer laser having a wavelength of 248 nm are applied under condition that the output is 10 mJ/cm$^2$ and the pulse frequency is 100 Hz, the silica glass article (i.e., optical fiber) exhibits a difference between the initial ultraviolet ray transmission and the ultraviolet ray transmission after irradiated with ultraviolet rays is not higher than 10% of the initial transmission at a wavelength of 248 nm.

The present invention will be described in detail with reference to the following Examples and comparative Examples, but the invention should not be construed as being limited thereto.

EXAMPLE 1

Figure 5:
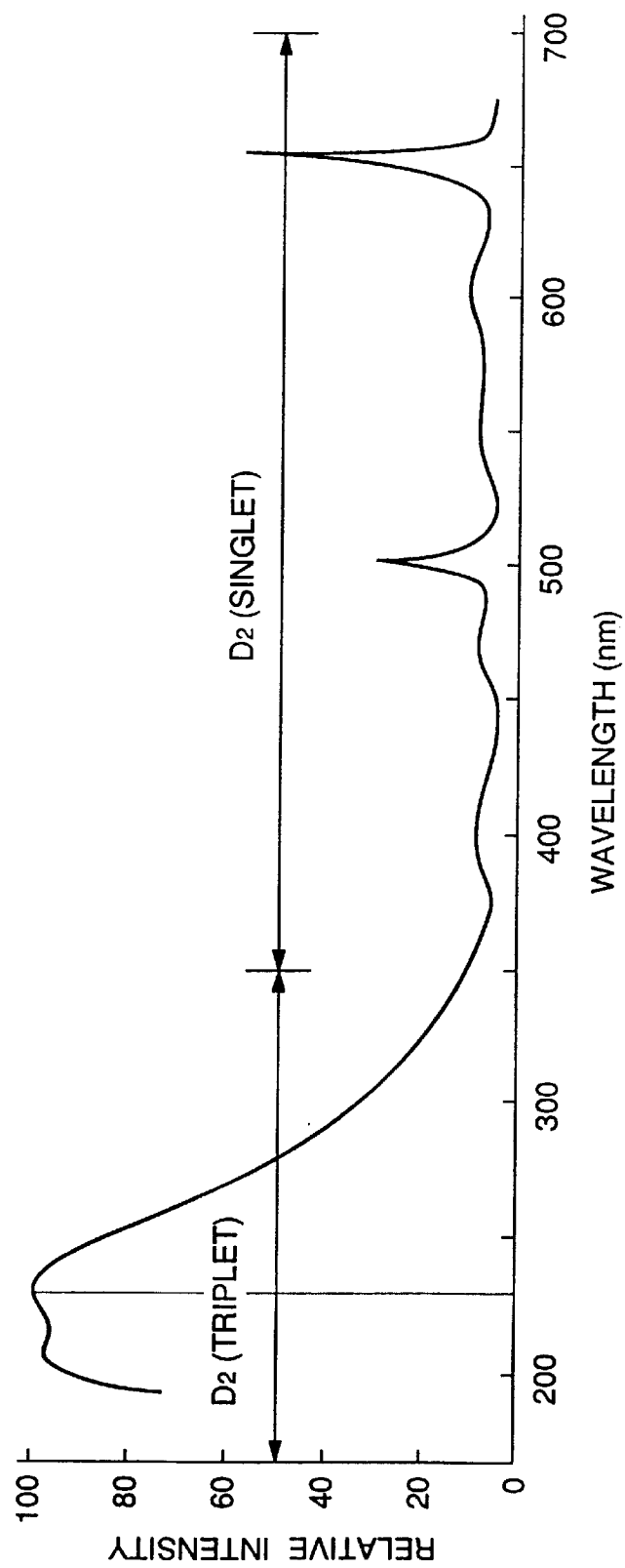
FIG. 5 is a graph showing an emission spectrum of a deuterium lamp.

One meter length of an optical fiber composed of: a high-purity silica glass core containing OH groups in an amount of 1000 ppm and Cl in an amount lower than 1 ppm; and a silica glass clad (relative refractive index difference Δn=1.0) to which fluorine was added (in an amount of 3 wt %) was, from both ends thereof, irradiated by a deuterium lamp for 24 hours. Assuming that the refractive index of the core is $n_{core}$ and the refractive index of the clad is $n_{clad}$, the relative refractive index difference Δn can be expressed by the equation $\{\Delta n=(n_{core}-n_{clad})/n_{core}\}$. The deuterium lamp had the wavelength spectrum shown in FIG. 5 and a broad light emission peak in the vicinity of a wavelength of 230 nm (5.4 eV). The transmittance (initial transmittance $T_0$) before irradiation using the deuterium lamp and transmittance ($T_1$) after subjected to the irradiation were measured in the wavelength region from 200 nm to 450 nm (measuring apparatus: Instantaneous Multi-Photometry System Model No. MCPD-200 manufactured by Otuka Electronics Co.). The transmission characteristics in the overall region from a wavelength of 200 nm to 450 nm are shown in FIG. 1, in the form of relative transmittance $T_R$ with respect to the initial transmittance which is regarded as 1.00 for each wavelength, with a solid line having marks x. It can be understood that defects in glass were generated in the optical fiber as a result of the irradiation and the transmittance deteriorated.

The optical fiber was immediately allowed to stand in an atmosphere of hydrogen gas ($H_2$), the pressure of which was 1 atm, for one week. As a result, ultraviolet ray transmission characteristics (relative change with respect to the initial transmittance similar to the above) as indicated in FIG. 1 with a solid line having marks o was obtained. Light absorption due to defects in glass became extinct.

The ultraviolet ray transmission characteristics of the above optical fiber after irradiated again with the deuterium lamp for 24 hours was as indicated with a solid line having square marks shown in FIG. 1. The transmission characteristic was the same as that realized immediately after the hydrogen treatment. In the wavelength region from 200 nm to 300 nm, no increase in the light absorption by irradiation was observed. As a result, it can be understood that deterioration does not occur after the optical fiber is subjected to the process according to the present invention, even if ultraviolet ray irradiation is performed.

EXAMPLE 2

A bundle fiber (having a length of 1 m) was manufactured by bundling one hundred optical fibers each composed of: a high-purity silica glass core containing OH groups in an amount of 1000 ppm and Cl in an amount lower than 1 ppm; and a silica glass clad (relative refractive index difference Δn=1.0) to which fluorine was added (in an amount of 3 wt %). The bundle fiber had both ends fixed by epoxy resin. Then, KrF excimer laser (wavelength: 248 nm, 5 eV) was applied to both ends of the bundle fiber in the axial direction. The irradiation conditions were 100 mJ/cm$^2$/pulse and $10^6$ pulses at 50 Hz. As a result of the irradiation, defects were generated in the optical fibers and a reduction in the transmittance was greater than that realized in Example 1 shown in FIG. 1. Then, the optical fiber was immediately exposed to a hydrogen gas atmosphere having a temperature of 80° C. and a pressure of 5 atm, for one week. As a result, the resulting relative transmittance of 1.00 was realized and light absorption due to defects in the glass became extinct as in the case of Example 1. Furthermore, the bundle fiber was irradiated by the deuterium lamp for 48 hours. As a result, no increase in the light absorption by the irradiation was observed in the wavelength region from 200 nm to 300 nm. Moreover, irradiation with KrF excimer laser was performed under conditions of 100 mJ/cm$^2$/pulse and $10^6$ pulses at 50 Hz. No increase in the light absorption was observed in the wavelength region from 200 nm to 300 nm.

EXAMPLE 3

An optical fiber (having a length of 1000 m) each composed of: a high-purity silica glass core containing OH groups in an amount of 2000 ppm and Cl in an amount lower than 1 ppm; and a silica glass clad to which fluorine was added, was wound. Then, γ-rays (photon energy of 1.17 MeV and 1.33 MeV), the source of which was $^{60}$Co were applied to the overall body of the wound optical fibers. The dose of radiation absorbed by the fiber was $10^3$ Gy. As a result of the irradiation, defects were generated in the optical fibers and a reduction in the transmittance was greater than that realized in Example 1. Then, the optical fiber was immediately exposed to a hydrogen gas atmosphere having a temperature of 80° C. and a pressure of 5 atm, for one week. As a result, the light absorption occurring due to the defects became extinct and the relative transmittance returned to 1.00. The fiber was cut to a length of 1 m, and then irradiated with the deuterium lamp for 48 hours. As a result, no increase in the light absorption was observed in the wavelength region from 200 nm to 300 nm. Moreover, irradiation with KrF excimer laser was performed under conditions of 100 mJ/cm$^2$/pulse and $10^6$ pulses at 50 Hz. No increase in the light absorption was observed in the wavelength region from 200 nm to 300 nm.

EXAMPLE 4

A high-purity silica glass plate (30 mm×30 mm×5 mm) containing OH groups in an amount of 2000 ppm and Cl in an amount lower than 1 ppm was irradiated with γ-rays (photon energy of 1.17 MeV and 1.33 MeV), the source of which was $^{60}$Co. The dose of radiation absorbed by the fiber was $10^3$ Gy. As a result, defects were generated in the high-purity silica glass plate and great reduction in the transmittance was observed. The high-purity silica glass plate was immediately exposed to a hydrogen gas atmosphere having a temperature of 200° C. and a pressure of 10 atm, for one week. As a result, the light absorption occurring due to the defects became extinct. The high-purity silica glass plate was irradiated with KrF excimer laser of 10 mJ/cm$^2$/1 pulse and $10^4$ pulses at 50 Hz. No increase in the light absorption was observed in the wavelength region from 170 nm to 300 nm.

EXAMPLE 5

Figure 2:
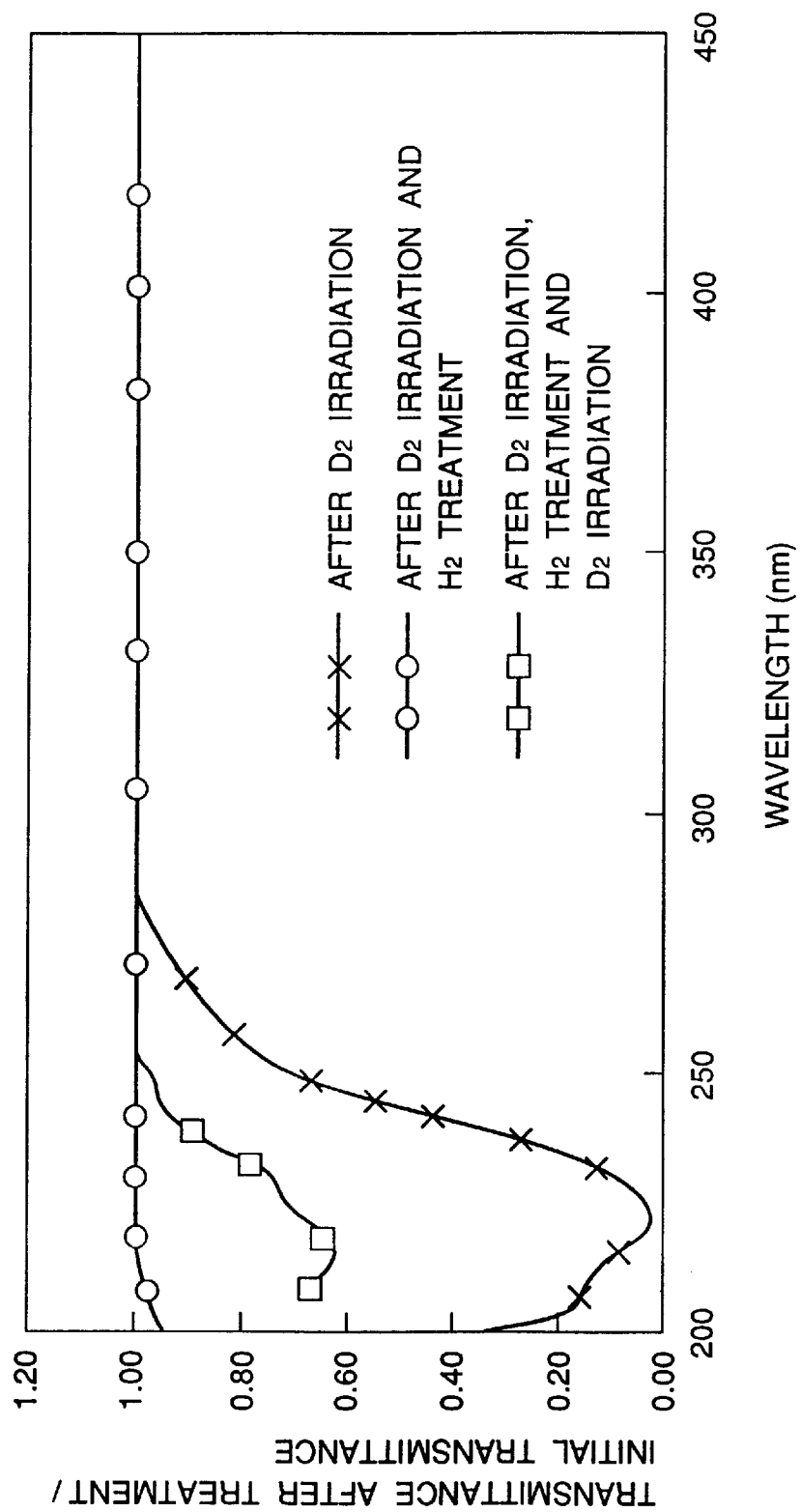
FIG. 2 shows the transmission spectra, as normalized by the initial transmission spectrum, of a silica glass article according to Example 5 after it has been subjected to the respective treatments.

An optical fiber (having a length of 1 m) composed of: a high-purity silica glass core containing OH groups in an amount of 500 ppm and Cl in an amount of 300 ppm; and a silica glass clad to which fluorine was added, was irradiated by a deuterium lamp from both ends thereof in the axial direction for 24 hours. As a result, defects were generated in the optical fiber so that a light absorption characteristic as shown in FIG. 2 was realized. The optical fiber was immediately exposed to a hydrogen gas atmosphere having a room temperature and a pressure of 1 atm, for one week. As a result, light absorption occurring due to the defects became extinct completely. The fiber was again irradiated by the deuterium lamp for 24 hours. As a result, increase in the light absorption was observed in the wavelength region from 200 nm to 300 nm. The results were shown in FIG. 2 in the same manner as in FIG. 1.

Comparative Example 1

An optical fiber preform composed of a fluorine-doped silica glass clad and a high-purity silica glass core containing OH groups in an amount of 2000 ppm and Cl in an amount lower than 1 ppm was manufactured. The optical fiber preform was previously irradiated with $10^3$ Gy γ-rays. Then, the optical fiber preform was drawn so that an optical fiber having a diameter of 200 μm was manufactured. The resulting optical fiber having a length of 1 m was exposed to a $H_2$ atmosphere at 80° C. and 5 atm for one week. The fiber was irradiated with $10^6$ pulses of KrF excimer laser at 100 $mJ/cm^2$/pulse at 50 Hz. As a result, increase in the light absorption was observed in the wavelength region from 200 nm to 300 nm. As a result, a fact can be understood that no effect is obtained even if the glass optical fiber preform is irradiated with γ-rays.

EXAMPLE 6

The fiber having an excellent ultraviolet ray characteristic and according to Example 3 was again irradiated with $10^6$ Gy γ-rays. Increase in a loss not smaller than 100 dB/km took place at 500 nm. As a result, an effect of the limitation according to the present invention that the dose should be $10^4$ Gy or smaller can be confirmed.

EXAMPLE 7

An optical fiber (having a length of 1000 m) each composed of a fluorine-doped silica glass clad and a high-purity silica glass core containing OH groups in an amount of 2000 ppm and Cl in an amount lower than 1 ppm, was wound. The wound optical fiber was posited one meter from an X-ray tube having a W (tungsten) target and was irradiated with X-rays for one hour at the applied voltage of 50 kV and tube current of 80 mA. As a result, defects were generated in the optical fibers and a reduction in the transmittance of the same degree with that in Example 1 was observed. The optical fiber was immediately exposed to a hydrogen atmosphere, the temperature of which was 80° C. and the pressure of which was 5 atm for one week. As a result, light absorption occurring due to the defects became extinct, and the relative transmittance returned to 1.00. The fiber was cut to a length of 1 m, and then irradiated with the deuterium lamp for 48 hours. As a result, no increase in the light absorption was observed in the wavelength region from 200 nm to 300 nm. Moreover, irradiation with KrF excimer laser was performed under conditions of 100 $mJ/cm^2$/pulse and $10^6$ pulses at 50 Hz. No increase in the light absorption was observed in the wavelength region from 200 nm to 300 nm.

EXAMPLE 8

Optical fibers (having a length of 1000 m) each composed of a fluorine-doped silica glass clad and a high-purity silica glass core which contained OH groups in an amount of 300 ppm and Cl in an amount lower than 1 ppm and which was doped with fluorine (1 wt %), were wound. Then, γ-rays (photon energy of 1.17 MeV and 1.33 MeV), the source of which was $^{60}Co$ were applied to the overall body of the wound optical fibers. The dose of radiation absorbed by the fiber was $10^3$ Gy. As a result, defects were generated in the optical fibers and a reduction in the transmittance was greater than that realized in Example 1. Then, the optical fiber was immediately exposed to a hydrogen gas atmosphere having a temperature of 80° C. and a pressure of 5 atm, for one week. As a result, the light absorption occurring due to the defects became extinct and the relative transmittance returned to 1.00. The fiber was cut to a length of 1 m, and then irradiated with the deuterium lamp for 48 hours. As a result, no increase in the light absorption was observed in the wavelength region from 200 nm to 300 nm. Moreover, irradiation with KrF excimer laser was performed under conditions of 100 $mJ/cm^2$/pulse and $10^6$ pulses at 50 Hz. No increase in the light absorption was observed in the wavelength region from 200 nm to 300 nm.

EXAMPLE 9

The same procedure as in Example 8 was followed, except that only the wavelength of the excimer laser and the irradiation condition in Example 8 were changed. Irradiation with ArF excimer laser was performed at 10 $mJ/cm^2$/pulse and $10^4$ pulses at 50 Hz. No increase in the light absorption was observed in the wavelength region from 170 nm to 300 nm.

EXAMPLE 10

Optical fibers (having a length of 1000 m) each composed of a fluorine-doped silica glass clad and a high-purity silica glass core which contained OH groups in an amount of 300 ppm and Cl in an amount lower than 1 ppm and which was doped with fluorine (1 wt %), were wound. Then, γ-rays (photon energy of 1.17 MeV and 1.33 MeV), the source of which was $^{60}Co$ were applied to the overall body of the wound optical fibers. The dose of radiation absorbed by the fiber was $10^6$ Gy. As a result, defects were generated in the optical fibers and a reduction in the transmittance was greater than that realized in Example 1. Then, the optical fiber was immediately exposed to a hydrogen gas atmosphere having a temperature of 80° C. and a pressure of 5 atm, for one week. As a result, the light absorption occurring due to the defects became extinct and the relative transmittance returned to 1.00. The fiber was cut to a length of 1 m, and then irradiated with the deuterium lamp for 48 hours. As a result, no increase in the light absorption was observed in the wavelength region from 200 nm to 300 nm. Moreover, irradiation with KrF excimer laser was performed under conditions of 10 $mJ/cm^2$/pulse and $10^8$ pulses at 50 Hz. No increase in the light absorption was observed in the wavelength region from 200 nm to 300 nm. In a numerical viewpoint, the optical fiber according to this example has the difference of 10% or lower between the initial transmittance of ultraviolet rays and the transmittance of ultraviolet rays after ultraviolet ray irradiation was performed.

In each of the above Examples, irradiation by using the deuterium lamp was performed in such a manner that the output from the lamp was 150 W and the distance from the lamp to the hydrogen was 15 cm. The irradiation was conducted from both ends of the optical fiber in the axial direction of the optical fiber.

EXAMPLE 11

Optical fibers were manufactured by processing in the same manner as in Examples 1 to 10 and comparative Example 1, respectively. Then, the hydrogen molecule concentrations in each optical fiber immediately after conducting the respective step (2) were obtained by a Raman analysis disclosed in Document (13). The results were shown in Table 1.

TABLE 1

| Example No. | Hydrogen Molecule Concentration in Silica Glass Fiber immediately after Step (2) (molecules/cm$^3$) |
|---|---|
| Example 1 | $8 \times 10^{18}$ |
| Example 2 | $3 \times 10^{19}$ |
| Example 3 | $3 \times 10^{19}$ |
| Example 4 | $8 \times 10^{19}$ |
| Example 5 | $3 \times 10^{18}$ |
| Comparative Example 6 | $3 \times 10^{19}$ |
| Example 6 | $3 \times 10^{19}$ |
| Example 7 | $3 \times 10^{19}$ |
| Example 8 | $3 \times 10^{19}$ |
| Example 9 | $3 \times 10^{19}$ |
| Example 10 | $3 \times 10^{19}$ |

Examples 12 to 21 in which treatments were conducted up to step (3) or step (4) according to the present invention and comparative Examples 2 to 4 are described below. Irradiation conditions in the ultraviolet ray resistance tests performed to evaluate each optical fiber according to each example were as follows.

Irradiation with KrF excimer laser: wavelength 248 nm; 5 eV; 10 mJ/cm$^2$/pulse; 1000 Hz; and $10^8$ pulses were applied to both ends of the optical fiber in the axial direction of the optical fiber.

Irradiation with ArF excimer laser: wavelength 193 nm; 6.4 eV; 10 mJ/cm$^2$/pulse; 1000 Hz; and $10^4$ pulses were applied to both ends of the optical fiber in the axial direction of the optical fiber.

Irradiation by deuterium lamps: lamp output 150 W, the distance from lamp to optical fiber was 15 cm and the optical fiber was irradiated from both ends thereof in the axial direction of the optical fiber.

Irradiation with γ-rays: irradiation source $^{60}$Co, 1.17 MeV and 1.33 MeV.

The evaluation of the result of the ultraviolet ray resistance test was made by comparing a (initial) ultraviolet ray transmittance immediately before the irradiation (transmittance immediately after the completion of the final treatment step) and a ultraviolet ray transmittance after the irradiation.

In the ultraviolet ray resistance test, increase in the absorbed ultraviolet ray amount in the ultraviolet ray region is determined by the laser output and the number of applied pulses. The frequency of the pulses is a value which can practically be selected. If a high frequency is employed, a required amount of irradiation can be realized in a short time.

EXAMPLE 12

Figure 8:
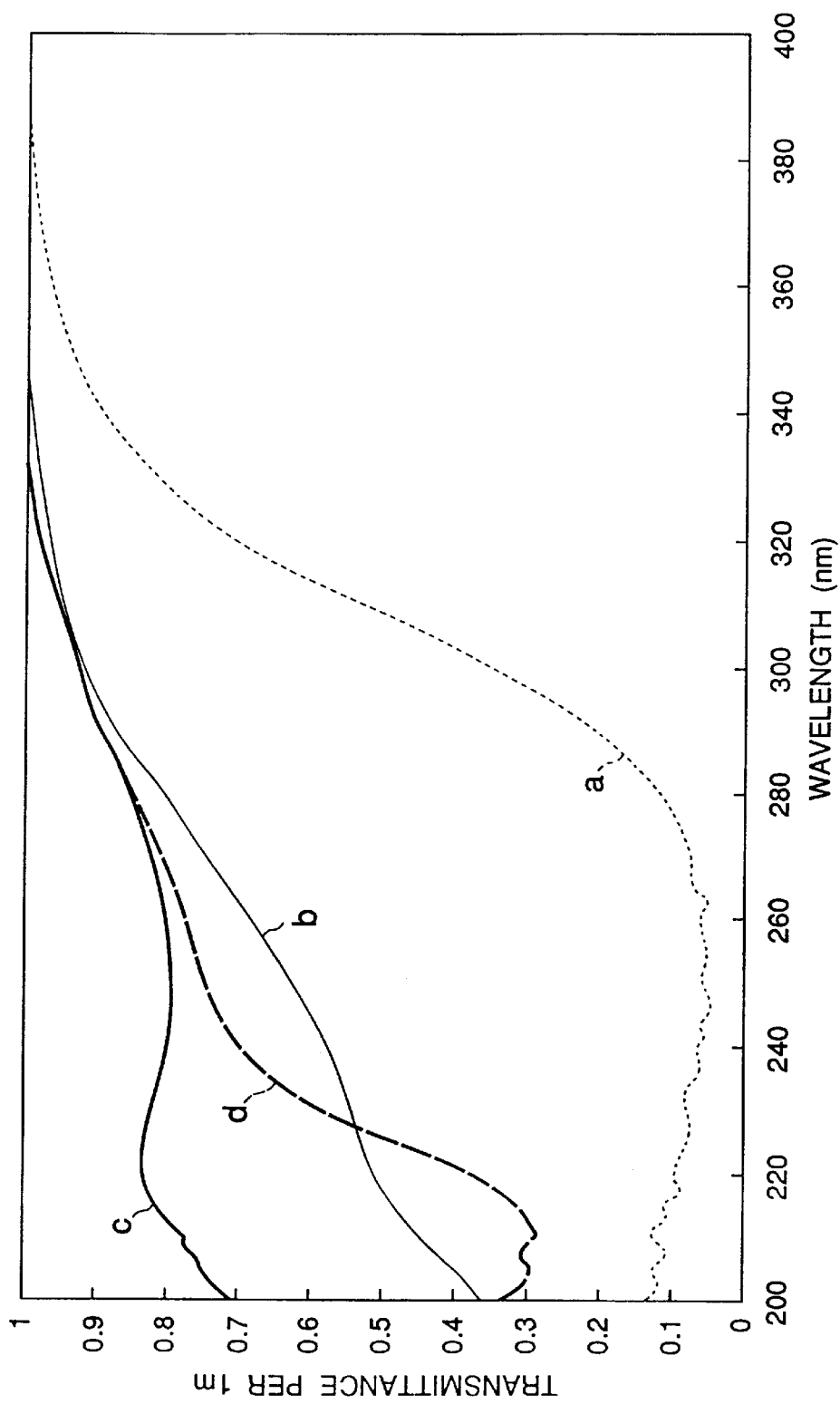
FIG. 8 shows the transmission spectra of an optical fiber that has been subjected to the respective steps and the ultraviolet ray resistance test in Example 12.

Optical fibers (having a length of 1000 m) each of which was composed of: a silica glass core containing fluorine in an amount of 1 wt %; and a silica glass clad containing fluorine in an amount of 3 wt %, were wound. The overall body of the bundle was irradiated with γ-rays (photon energy of 1.17 MeV and 1.33 MeV) the source of which was $^{60}$Co (step (1)). At this time, the dose of radiation absorbed by the fiber was $10^3$ Gy. The bundle was immediately exposed to a hydrogen atmosphere, the temperature of which was 80° C. and the pressure of which was 10 atm, for one week (step (2)). At this time, the concentration of hydrogen molecules in the optical fiber was $7 \times 10^{19}$ molecules/cm$^3$. The fiber was cut to a length of 1 m, and then the optical fiber was irradiated from both ends thereof with $10^7$ pulses of KrF excimer laser (wavelength: 248 nm, 5 eV) under irradiation condition of 10 mJ/cm$^2$/pulse and 1000 Hz (step (3)). Thus, the optical fiber according to the present invention was obtained. The transmittances immediately after the respective step are shown in FIG. 8. In the figure, the curve referred to (a) is the transmittance after the step (1), the curve referred to (b) is the transmittance after the step (2), the curve referred to (c) is the transmittance after the step (3), and the curve referred to (d) is the transmittance after the ultraviolet ray resistance test. The transmittances shown in FIG. 8 are those expressed by the Equation 1 shown below, when light having a wavelength of λ is made incident on an end of an optical fiber at an intensity of $I_0$ and is emitted through another end of the optical fiber at an intensity of I.

$$\text{Transmittance } T(\lambda) = I(\lambda)/I_0(\lambda) \quad \text{Equation 1}$$

The ultraviolet ray resistance test was performed in such a manner that the obtained optical fiber was irradiated from both ends thereof with $10^8$ pulses of KrF excimer laser. The deterioration in transmittance at a wavelength of 248 nm was merely such that the transmittance after the irradiation was 96% of the transmittance after the step (3) (before the irradiation for testing). This result can be seen in FIG. 8.

EXAMPLE 13

The same procedure as in Example 12 was followed, except that the absorption dose of radiation in the step (1) was changed to $10^2$ Gy. The optical fiber thus obtained was subjected to a ultraviolet ray resistance test by application of $10^8$ pulses of KrF excimer laser in the same manner as in Example 12. The results were similar to those obtained in Example 12.

EXAMPLE 14

One meter length of an optical fiber composed of: a silica glass core containing fluorine in an amount of 1 wt %; and a silica glass clad containing fluorine in an amount of 3 wt % was subjected to the same treatment steps (1) to (3) as in Example 12. The dose of radiation absorbed by the optical fiber in step (1) and the concentration of hydrogen molecules in the optical fiber realized immediately after step (2) were each the same as those in Example 12. After step (3) was performed, the optical fiber was heated to 40° C. for three weeks (about 500 hours) so that removal of hydrogen was performed (step (4)) so that the optical fiber according to the present invention was obtained. The concentration of hydrogen molecules in the thus obtained optical fiber was not higher than a measurement limit (less than $1 \times 10^{16}$ molecules/cm$^3$).

The optical fiber thus obtained was subjected to the ultraviolet ray resistance test by application of $10^8$ pulses of KrF excimer laser in the same manner as in Example 12. As a result, the deterioration in transmittance at a wavelength of 248 nm was merely such that the transmittance after the irradiation for testing was 93% of the transmittance after the step (4).

Comparative Example 2

The same optical fiber (having a length of 1 m) as used in Example 14 was subjected to steps (1) and (2) in the same manner as in Example 14. After the step (2) was completed, the optical fiber was, in the atmosphere, heated to 60° C. for 10 days so that Hydrogen was removed. As a result, the concentration of hydrogen molecules in the fibers was not higher than the measurement limit (less than $1 \times 10^{16}$ molecules/cm$^3$).

The optical fiber, from which hydrogen was removed, was subjected to the ultraviolet ray resistance test by application of $10^8$ pulses of KrF excimer laser in the same manner as in Examples 12 and 14. As a result, the transmittance at a wavelength of 248 nm was deteriorated to 63% of the transmittance immediately after the step (4) (removal of hydrogen).

EXAMPLE 15

The same optical fiber (having a length of 1 m) as used in Example 14 was subjected to steps (1) and (2) in the same manner as in Example 14. The concentration of hydrogen molecules in the optical fiber after step (2) was $7 \times 10^{19}$ molecules/cm$^3$. The optical fiber (having a length of 1 m) thus obtained according to the present invention was subjected to the ultraviolet ray resistance test by irradiating With the deuterium lamp for 24 hours. As a result, the transmittance at a wavelength of 248 nm showed almost no changes from the transmittance immediately after the step (2). Then, the irradiation by the deuterium lamp was continued for 3 months, but no change in the transmission characteristic was observed.

EXAMPLE 16

One meter length of an optical fiber which is composed of: a core made of pure silica glass (SiO2) containing OH groups in an amount of 1000 ppm and Cl in an amount lower than 1 ppm; and a silica glass clad containing fluorine in an amount of 3 wt %, and which has a length of 1 m was irradiated with γ-rays (photon energy of 1.17 MeV and 1.33 MeV), the source of which was $^{60}$Co, in such a manner that the dose of radiation absorbed by the fiber was $10^2$ Gy (step (1)). The fiber was immediately exposed to a hydrogen atmosphere, the temperature of which was 80° C. and the pressure of which was 10 atm, for one week (step (2)). The concentration of hydrogen molecules in the optical fiber at the completion of the step (2) was $7 \times 10^{19}$ molecules/cm$^3$. Then, the optical fiber was irradiated from both ends thereof with $10^7$ pulses of KrF excimer laser (wavelength: 248 nm, 5 eV) under condition of 10 mJ/cm$^2$/pulse and 1000 Hz (step (3)).

The optical fiber (having a length of 1 m) thus obtained according to the present invention was subjected to the ultraviolet ray resistance test in such a manner that the optical fiber was irradiated by the deuterium lamp for 24 hours. As a result, however, the transmittance at a wavelength of 248 nm was not almost changed from the transmittance immediately after the step (3). Then, the irradiation by the deuterium lamp was continued for 3 months, but no change in the transmission characteristic was observed.

EXAMPLE 17

One meter of an optical fiber composed of: a silica glass core containing fluorine by 1 wt %; and a silica glass clad containing fluorine in an amount of 3 wt % was subjected to steps (1) and (2) in the same manner as in Example 14. Step (3) was performed in such a manner that the γ-rays which was the same as that used in the step (1) were applied up to an absorption dose of radiation of $10^2$ Gy. The optical fiber thus obtained according to the present invention was subjected to an ultraviolet ray resistance test in such a manner that the optical fiber was irradiated from both ends thereof with $10^8$ pulses of KrF excimer laser in the axial direction of the optical fiber. As a result, the deterioration in transmittance at a wavelength of 248 nm was merely such that the transmittance after the irradiation for testing was 93% of the transmittance immediately after the step (3)

EXAMPLE 18

The same procedure as in Example 17 was followed, except that the absorption dose of the γ-rays irradiation in step (1) was changed to $10^2$ Gy. An optical fiber thus obtained according to the present invention was then irradiated with $10^8$ pulses of KrF excimer laser in the same manner as in Example 17. A similar reduction in the transmittance to that realized in Example 17 was observed.

EXAMPLE 19

The same optical fiber (having the same length) as in Examples 17 and 18, which is composed of: a silica glass core containing fluorine by 1 wt %; and a silica glass clad containing fluorine in an amount of 3 wt %, was irradiated with γ-rays (photon energy of 1.17 Me and 1.33 MeV) the source of which was $^{60}$Co (step (1)). At this time, the dose of radiation absorbed by the fiber was $10^2$ Gy. The optical fiber was immediately exposed to a hydrogen atmosphere, the temperature of which was 80° C. and the pressure of which was 10 atm, for one week (step (2)). At this time, the concentration of hydrogen molecules in the optical fiber was $7 \times 10^{19}$ molecules/cm$^3$. The fiber was irradiated from both ends thereof with $10^3$ pulses of ArF excimer laser (wavelength: 193 nm, 6.4 eV) at 10 mJ/cm$^2$/pulse and 1000 Hz (step (3)).

The optical fiber thus obtained according to the present invention was subjected to the ultraviolet ray resistance test in such a manner that the optical fiber was irradiated from both ends thereof with $10^4$ pulses of ArF excimer laser. As a result, the deterioration in transmittance at a wavelength of 248 nm was merely such that the transmittance after the irradiation for testing was 92% of the (initial) transmittance immediately after the step (3).

EXAMPLE 20

The same procedure as in Example 19 was followed, except that irradiation of $10^7$ pulses of KrF excimer laser under conditions of 10 mJ/cm$^2$/pulse and 1000 Hz was conducted as step (3) in place of the ArF excimer laser irradiation in Example 19.

The optical fiber thus obtained according to the present invention was irradiated from both ends thereof with ArF excimer laser as the ultraviolet ray resistance test. As a result, the deterioration in transmittance at a wavelength of 248 nm was merely such that the transmittance after the irradiation for testing was 92% of the (initial) transmittance immediately after the step (3).

EXAMPLE 21

The same optical fiber (having the same length) as in Examples 17 to 20, which is composed of: a silica glass core containing fluorine by 1 wt %; and a silica glass clad containing fluorine in an amount of 3 wt %, was irradiated with $10^8$ pulses of KrF excimer laser (wavelength: 248 nm, 5 eV) at 100 mJ/cm$^2$/pulse and 100 Hz, as step (1). Steps (2) and (3) were performed in the same manner as in Example 20. The optical fiber thus obtained according to the present invention was subjected to the ultraviolet ray resistance test in such a manner that the optical fiber was irradiated from both ends thereof with KrF excimer laser. As a result, the deterioration in transmittance at a wavelength of 248 nm was merely such that the transmittance after the irradiation for testing was 95% of the (initial) transmittance immediately after the step (3).

EXAMPLE 22

One meter length of an optical fiber which is composed of: a core made of pure silica glass (SiO$_2$) containing OH groups in an amount of 1000 ppm and chlorine (Cl) in an amount smaller than 1 ppm; and a silica glass clad containing fluorine in an amount of 3 wt %, and which has a length of 1 m was irradiated with γ-rays (photon energy of 1.17 Me and 1.33 MeV) the source of which was $^{60}$Co in such a manner that the dose of radiation absorbed by the fiber was $10^3$ Gy. The optical fiber was immediately exposed to a hydrogen atmosphere, the temperature of which was 80° C. and the pressure of which was 10 atm, for one week. The concentration of hydrogen molecules in the optical fiber was $7\times10^{19}$ molecules/cm$^3$ after the above step (2) was completed. Step (3) was performed in such a manner that the optical fiber was irradiated from both ends thereof with $10^7$ pulses of KrF excimer laser (the wavelength: 248 nm, 5 eV) at 10 mJ/cm$^2$/pulse and 1000 Hz.

The optical fiber thus obtained was subjected to the ultraviolet ray resistance test in such a manner that the optical fiber was irradiated from both ends thereof with $10^7$ pulses of KrF excimer laser (wavelength: 248 nm, 5 eV) at 10 mJ/cm$^2$/pulse and 1000 Hz. As a result, the transmittance at a wavelength of 248 nm was not substantially changed. However, when the test condition was changed to a $10^8$ pulse irradiation, the transmittance at a wavelength of 248 nm was reduced to about 74% of the transmittance after step (3).

EXAMPLE 23

The optical fiber according to the present invention which is obtained in Example 16 was again irradiated with γ-rays in such a manner that the absorption dose was $10^6$ Gy. As a result, increase in the transmission loss of 100 dB/km or greater was observed with the foregoing optical fiber at a wavelength of 500 nm.

A high-purity silica glass article is subjected to step (1) in which the high-purity silica glass article is irradiated with electromagnetic waves having energy with which defects can be generated, that is, photon energy not smaller than 3.5 eV so that defects are generated in the glass, and subjected to step (2) in which the high-purity silica glass article is immersed in an atmosphere composed of a hydrogen gas. Thus, the defects are allowed to disappear so that substantial increase in the light absorption in the ultraviolet ray region having a wavelength of from 160 nm to 300 nm occurring due to ultraviolet ray irradiation is prevented. Since irradiation with γ-rays is able to simultaneously process a large quantity of fibers and a small dose of $10^4$ Gy or smaller, preferably $10^3$ Gy is sufficiently large to obtain a satisfactory effect of preventing deterioration due to ultraviolet ray irradiation, a problem of deterioration in the coating for the fiber can be prevented.

Since step (3) in which electromagnetic waves are applied enables hydrogen in the glass article to be fixed, an article, such as the optical fiber, having a small diameter with respect to the diffusing speed of hydrogen is enabled to maintain ultraviolet ray resistance for a long time.

When step (4) of removing hydrogen is performed to follow step (3), surplus hydrogen in the glass can be removed. Thus, light absorption performed by the hydrogen molecules can be reduced and the characteristic can be stabilized.

Moreover, an advantage can be obtained in that the silica glass article has excellent light transmission in the vacuum ultraviolet ray region as compared in the atmosphere. Since the silica glass article has flexibility, the silica glass article according to the present invention can significantly advantageously be employed in an apparatus using an ultraviolet ray source, such as excimer laser beams, a deuterium lamp or a halogen lamp, in particular as a light transmission medium for a machining apparatus, for example, a laser machining apparatus, a photolithography apparatus, a fiber hardening ray source, an adhesion curing ray source, a variety of microelement machining apparatuses and an SR (synchrotron) light generating source.

For the confirmation of the effect of the present invention, the following examples and comparative examples were further conducted. Irradiation conditions in the ultraviolet ray resistance tests performed to evaluate each optical fiber according to each example and comparative example were such that irradiation with a KrF excimer laser of a wavelength 248 nm, 10 mJ/cm$^2$/pulse, and $10^8$ pulses were applied to both ends of the optical fiber.

EXAMPLE 24

Figure 9:
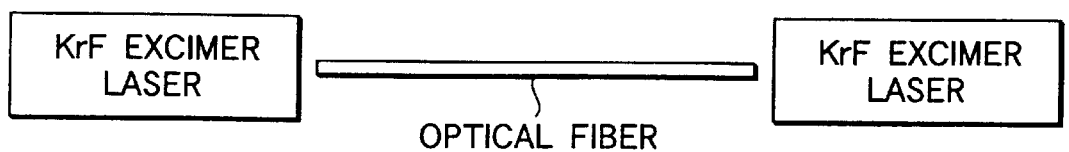
FIG. 9 is an explanatory drawing typically showing step (b) according to the present invention.
Figure 10:
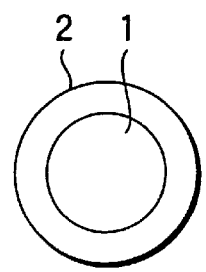
FIG. 10 is a schematic cross-sectional drawing showing the mono-core fiber used in examples according to the present invention.

As shown in FIG. 10, a mono-core optical fiber of 1,000 meter length composed of silica glass core 1 containing Cl in an amount lower than 1 ppm and fluorine (hereinafter referred to as (F)) in an amount of 1 wt %, and silica glass clad 2 containing F in an amount of 3 wt % was immersed in a hydrogen atmosphere, the pressure of which was 10 atm, at 80° C. for one week (step a), taken out from the hydrogen atmosphere, and then the optical fiber was cut to a length of 1 m and irradiated from both ends thereof with $10^7$ pulses of a KrF excimer laser having a wavelength of 248 nm at 10 mJ/cm$^2$/pulse as shown in FIG. 9 (step b). At this time, the concentration of hydrogen molecules in the optical fiber was $7\times10^{19}$ molecules/cm$^3$.

The ultraviolet ray resistance test was performed in such a manner that the above-obtained optical fiber having a length of 1 m was irradiated with $10^6$ pulses of a KrF excimer laser. The transmittance at a wavelength of 248 nm after irradiation was merely deteriorated to about 96% of the transmittance at initial stage (the transmittance immediately after the final step of the present invention and before the irradiation for testing). The optical fiber showed sufficient ultraviolet ray resistance characteristics.

EXAMPLE 25

A mono-core optical fiber of one meter length composed of silica glass core containing Cl in an amount lower than 1 ppm and fluorine (F) in an amount of 1 wt %, and silica glass clad containing fluorine (F) in an amount of 3 wt % was allowed to stand in a hydrogen atmosphere, the pressure of which was 10 atm, at 80° C. for one week, taken out from the hydrogen atmosphere, and irradiated from both ends thereof with $10^7$ pulses of a KrF excimer laser having a wavelength of 248 nm at 10 mJ/cm$^2$/pulse as shown in FIG. 9. At this time, the concentration of hydrogen molecules in the optical fiber was $1\times10^{19}$ molecules/cm$^3$. The optical fiber obtained was allowed to stand in an atmosphere at 40° C. for three weeks so that removal of hydrogen was performed. As a result, the concentration of hydrogen molecules in the optical fiber became less than $1 \times 10^{16}$ molecules/cm$^3$.

The thus-obtained optical fiber according to the present invention (1 m length) was subjected to the ultraviolet ray resistance test in the same manner as in Example 24. As a result, the deterioration in transmittance at a wavelength of 248 nm was merely such that the transmittance after the irradiation for testing was about 93% of the transmittance at initial stage (the transmittance immediately after the final step of the present invention and before the irradiation for testing). The optical fiber exhibited sufficient ultraviolet ray resistance characteristics. As a result of hydrogen removal treatment, an optical fiber having no fluctuation in refractive index with the lapse of time could be obtained.

EXAMPLE 26

Figure 11:
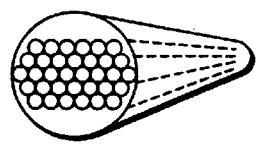
FIG. 11 is a schematic explanatory drawing showing the structure of the bundle fiber used in examples according to the present invention.

The same mono-core optical fibers used in Example 25 were bundled to form a bundle fiber (1 m length) as shown in FIG. 11. This bundle fiber was subjected to processes of each step according to the present invention in the same manner as in Example 25 to obtain the bundle fiber of the present invention. The thus-obtained bundle fiber (1 m) was subjected to the ultraviolet ray resistance test in the same manner as described above and evaluated. The same advantageous result that the transmittance at a wavelength of 248 nm after irradiation was merely deteriorated to about 96% of the transmittance at initial stage could be obtained.

EXAMPLE 27

An optical fiber according to the present invention was obtained according to the same procedure as in Example 24 except that the irradiation with a KrF excimer laser was performed only from one side of the optical fiber.

The thus-obtained optical fiber (1 m length) was subjected to the ultraviolet ray resistance test in the same manner as in Example 24 and evaluated. The transmittance at a wavelength of 248 nm after irradiation was merely deteriorated to about 93% of the transmittance at initial stage, which was the same advantageous result as in Example 24.

Comparative Example 3

Figure 12:
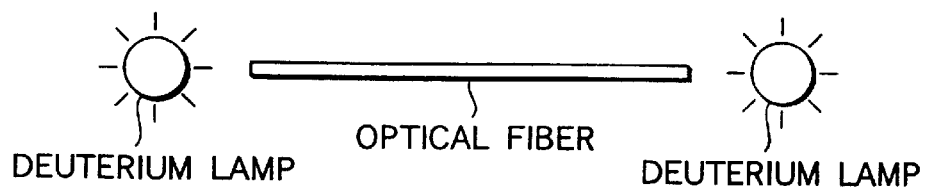
FIG. 12 is an explanatory drawing typically showing the process of deuterium lamp irradiation in Comparative Example 3 in the present invention.

A mono-core optical fiber (1,000 meter length) composed of silica glass core containing Cl in an amount lower than 1 ppm and fluorine (F) in an amount of 1 wt %, and silica glass clad containing F in an amount of 3 wt % was allowed to stand in a hydrogen atmosphere at 80° C. for one week, the pressure of which was 10 atm, taken out from the hydrogen atmosphere, and then the optical fiber was cut to a length of 1 m and irradiated by a deuterium lamp from both ends thereof for 24 hours as shown in FIG. 12. At this time, the concentration of hydrogen molecules in the optical fiber was $7 \times 10^{19}$ molecules/cm$^3$. Irradiation conditions were such that the output from the lamp was 150 W and the distance from the lamp to the fiber was 15 cm. The irradiation was conducted from both ends of the optical fiber.

The thus-obtained optical fiber for comparison (1 m length) was subjected to the ultraviolet ray resistance test in the same manner as in Example 24. As a result, the transmittance at a wavelength of 248 nm was remarkably deteriorated such that the transmittance after the irradiation for testing was about 30% of the transmittance at initial stage (the transmittance immediately after the final step and before the irradiation for testing).

Comparative Example 4

A mono-core optical fiber of one meter length composed of silica glass core containing Cl in an amount lower than 1 ppm and fluorine (F) in an amount of 1 wt %, and silica glass clad containing F in an amount of 3 wt % was allowed to stand in a hydrogen atmosphere at 80° C. for one week, the pressure of which was 10 atm, taken out from the hydrogen atmosphere, and then irradiated from both ends thereof with $10^5$ pulses of a KrF excimer laser having a wavelength of 248 nm at 10 mJ/cm$^2$/pulse as shown in FIG. 9. At this time, the concentration of hydrogen molecules in the optical fiber was $1 \times 10^{19}$ molecules/cm$^3$. The optical fiber obtained was allowed to stand in an atmosphere at 40° C. for three weeks so that removal of hydrogen was performed. As a result, the concentration of hydrogen molecules in the optical fiber became less than $1 \times 10^{16}$ molecules/cm$^3$.

The thus-obtained optical fiber for comparison (1 m length) was subjected to the ultraviolet ray resistance test in the same manner as in Example 24. As a result, the transmittance at a wavelength of 248 nm was remarkably deteriorated such that the transmittance after the irradiation for testing was about 30% of the transmittance at initial stage (the transmittance immediately after the final step and before the irradiation for testing).

As explained above, the starting material silica glass article is subjected to the step in which hydrogen molecules are introduced into the silica glass article, and subjected to the step in which the silica glass article is irradiated with an excimer laser having a wavelength of 248 nm at an appropriate quantity while the hydrogen molecules remaining in the optical fiber is not lower than $1 \times 10^{16}$ molecules/cm$^3$ to thereby forcibly convert defect precursors in the glass to defects to form a stable bonding between the defects and the hydrogen molecules. Thus, hydrogen can be fixed. The substantial increase in the light absorption in the ultraviolet ray region having a wavelength of from 160 nm to 300 nm, the increase occurring due to ultraviolet ray irradiation, is prevented. In particular, due to the fixation of hydrogen, an article, such as the optical fiber, having a small diameter with respect to the diffusion rate of hydrogen is enabled to maintain ultraviolet ray resistance for a long period of time. In addition, preliminary irradiation of electromagnetic waves is not required for converting precursors to defects and the conversion and the hydrogen fixation can be performed concurrently, which results in the improvement of productivity.

Further, by the addition of the step of removing hydrogen, surplus hydrogen not fixed in the glass can be removed. Thus, light absorption by the hydrogen molecules can be reduced, the characteristics of the article can be stabilized, fluctuation in refractive index with the lapse of time can be prevented and constant luminance can be obtained, and the use of a light in near infrared region becomes feasible because the absorption of the light by the hydrogen molecules does not occur.

Conventional fibers for use in the ultraviolet region are easily liable to be deteriorated due to ultraviolet irradiation therefore unpracticable. According to the process of the present invention, fibers can be used accompanied with no problems in the wavelength region of from 300 to 200 nm, further, even in a vacuum ultraviolet ray region without vacuuming.

Moreover, an advance can be obtained in that the silica glass article has excellent light transmission in the vacuum ultraviolet ray region as compared in the atmosphere. Since the silica glass article has flexibility, the silica glass article according to the present invention can significantly advantageously be employed in an apparatus using an ultraviolet ray source, such as excimer laser beams, a deuterium lamp or a halogen lamp, in particular, as a light transmission medium for a machining apparatus, such as a laser machining apparatus or a photolithography apparatus, and a light transmission medium for a fiber hardening ray source, an adhesion curing ray source, a variety of microelement machining apparatuses or an SR (synchrotron radiation) light generating source.

While the invention has been described in detail and with reference to specific examples thereof, it will be apparent to one skilled in the art that various changes and modifications can be made therein without departing from the spirit and scope thereof.

What is claimed is:

1. A silica glass article which is manufactured by a process comprising the steps of:
   (1) irradiating a silica glass article serving as a raw material with electromagnetic waves to generate defects therein;
   (2) immersing the thus irradiated silica glass article in an atmosphere comprising a hydrogen gas, thereby providing the resulting silica glass article with a characteristic that is effective for preventing it substantially from increasing its absorption within an ultraviolet region due to ultraviolet ray irradiation; and
   (3) irradiating again the silica glass article that has been subjected to the step, (2), with electromagnetic waves while hydrogen molecules remain therein.

2. The silica glass article according to claim 1, wherein the process further comprises, after the step (3), a step of (4) reducing the hydrogen molecules that are remaining in the silica glass article to not higher than $1 \times 10^{16}$ molecules/cm$^3$ by at least one of allowing it to stand in the atmosphere and heating at 80° C. or lower.

3. A silica glass article which is manufactured by a process comprising the steps of:
   (a) introducing hydrogen molecules to the silica glass article to have a hydrogen concentration of not lower than $1 \times 10^{16}$ molecules/cm$^3$, and
   (b) irradiating the hydrogen-introduced silica glass article with an excimer laser or not more than 100 Gy of γ-rays while the concentration of the hydrogen molecules present in the silica glass article is not lower than $1 \times 10^{16}$ molecules/cm$^3$,
   thereby providing the resulting silica glass article with a characteristic that is effective for preventing it substantially from increasing its absorption within an ultraviolet region due to ultraviolet ray irradiation such that the silica glass article has a transmittance after $10^8$ irradiation pulses of not less than 92% of the transmittance immediately after production.

4. The silica glass article according to claim 3, wherein the process further comprises:
   c) reducing the concentration of the hydrogen molecules which are present in the silica glass article to not higher than $1 \times 10^{16}$ molecules/cm$^3$ by at least one of allowing it to stand in the atmosphere and heating at a temperature not higher than 80° C.

5. The silica glass article having defects generated when its precursor is irradiated with a photon energy of not less than 3.5 eV, hydrogen atoms being bonded to the defects, wherein the silica glass article has a characteristic that it is substantially prevented from increasing its absorption within an ultraviolet region after irradiation by a deuterium lamp for 48 hours.

* * * * *